United States Patent [19]

Matsuura et al.

[11] Patent Number: 5,177,162
[45] Date of Patent: Jan. 5, 1993

[54] POLYMERIZATION OF OLEFINS

[75] Inventors: Mitsuyuki Matsuura; Takashi Fujita, both of Yokkaichi, Japan

[73] Assignee: Mitsubishi Petrochemical Company Limited, Marunouchi, Japan

[21] Appl. No.: 483,997

[22] Filed: Feb. 22, 1990

Related U.S. Application Data

[60] Continuation of Ser. No. 225,080, Jul. 26, 1988, abandoned, which is a division of Ser. No. 14,835, Feb. 2, 1987, Pat. No. 4,780,443.

[30] Foreign Application Priority Data

Jan. 13, 1986 [JP] Japan .................. 61-19232

[51] Int. Cl.$^5$ .............. C08F 4/651; C08F 4/654; C08F 10/00
[52] U.S. Cl. ..................... 526/70; 525/268; 526/119; 526/125; 526/351; 526/904
[58] Field of Search ............ 526/119, 125, 70; 525/268

[56] References Cited

U.S. PATENT DOCUMENTS

| 4,387,198 | 6/1983 | Sato et al. | 526/119 |
| 4,422,956 | 12/1983 | Arzoumanidis et al. | 526/128 |
| 4,442,224 | 4/1984 | Takitani et al. | 526/125 |
| 4,442,276 | 4/1984 | Kashiwa et al. | 526/125 |
| 4,547,552 | 10/1985 | Toyota et al. | 525/247 |
| 4,701,505 | 10/1987 | Fujii et al. | 526/119 |

FOREIGN PATENT DOCUMENTS

| 45977 | 2/1982 | European Pat. Off. | 526/128 |
| 86300 | 8/1983 | European Pat. Off. | |
| 2566782 | 1/1986 | France | |
| 57-31910 | 12/1981 | Japan | 526/70 |
| 61-78803 | 4/1986 | Japan | 526/125 |
| 62-15208 | 1/1987 | Japan | 520/125 |
| 8400441 | 9/1984 | Netherlands | 526/125 |

OTHER PUBLICATIONS

Chemical Abstracts, vol. 94, No. 4, Jan. 1981, p. 20, Abstract No. 16366a, Columbus, OH, US & JP-A-80 108 406 (Chisso Corp) 20-08-1980.

Primary Examiner—Edward J. Smith
Attorney, Agent, or Firm—Oblon, Spivak, McClelland, Maier & Neustadt

[57] ABSTRACT

The present invention relates to an improvement of the known Ziegler catalyst which comprises a combination of a titanium-containing component and an organoaluminum component, and the present invention is characterized by a specific titanium-containing component. Namely, this titanium-containing component is obtained by contacting a known titanium-containing component of the Ziegler type catalyst which comprises Ti, Mg and a halogen, with an alkoxyalkylsilane compound which is characterized in that at least one of the alkyl groups has a branched structure. This catalyst does not require a so-called external electron donor, and no reduction of the polymerization velocity caused by the use of the electron donor is entailed. When this catalyst is used, a propylene/ethylene block copolymer in which the molecular weight of the propylene/ethylene copolymer portion and/or the polyethylene portion is increased, that is, the rigidity and impact strength are increased, can be prepared.

48 Claims, No Drawings

POLYMERIZATION OF OLEFINS

This application is a continuation of application Ser. No. 07/225,080, filed Jul. 26, 1988, now abandoned, which was a divisional of application Ser. No. 07/014,835, filed Feb. 2, 1987, now U.S. Pat. No. 4,780,443.

BACKGROUND OF THE INVENTION

1. Field of the Art

The present invention relates to a catalyst for the polymerization of olefins. More particularly, the present invention relates to the polymerization of olefins, in which by using a specific catalyst for the polymerization of olefins, especially u-olefins having at least 3 carbon atoms, highly stereoregular polymers can be prepared under stable polymerization conditions industrially advantageously.

Furthermore, the present invention relates to a process in which propylene or a mixture of propylene and ethylene is polymerized in the presence of a specific catalyst through at least two steps to prepare a propylene copolymer, especially a propylene block copolymer.

According to the process of the present invention, a propylene copolymer having high rigidity, high impact strength and good flowability can be prepared with a high activity while controlling formation of a low crystallinity by-product.

Moreover, the present invention relates to a process in which an olefin is polymerized in the presence of a specific catalyst, and a solvent used in the polymerization and left after separation and recovery of the polymer from the reaction mixture is recycled to the polymerization step and used again for the polymerization, whereby a polyolefin can be prepared at a high efficiency.

A conventional catalyst for the polymerization of olefins, which comprises a solid catalyst component comprising titanium, magnesium and a halogen as the indispensable ingredients and an organoaluminum compound has a very high activity but is defective in that if the stereoregularity of the polymer is important, an electron donor compound should be used in the polymerization process.

However, when a catalyst comprising an electron donor compound as the third component, viz. an external electron donor, is used, the polymerization velocity is reduced, since the electron donor compound reacts with the organoaluminum compound, and if the polymerization temperature is elevated in an effort to increase the productivity of the polymer, this undesired reaction is also promoted and, therefore, increase of the polymerization quantity, viz. increase of the production efficiency, is limited. Accordingly, the catalyst is defective in that it is difficult to control the molecular weight and other properties of the polymer produced thereby.

2. Prior Art

Under this background, development of a catalyst system not comprising an electron donor compound as the third component, an external electron donor, capable of providing a highly stereoregular polymer in a high catalyst yield, is desired for solving the foregoing problems.

For example, Japanese Patent Application Laid-Open Specification No. 138715/1983, equivalent to U.S. Pat. No. 4,442,276, discloses a process in which the polymerization is carried out in the presence of a catalyst system which is formed of an organoaluminum compound and a solid component obtained by reacting (1) a titanium composite comprising tetravalent titanium, magnesium, a halogen and an electron donor as the indispensable ingredients with (2) an organic silicon compound having an Si—O—C linkage in the presence of an organoaluminum compound or by treating the above-mentioned titanium composite with an organoaluminum compound and reacting the thus treated titanium composite with the organic silicon compound, without using an external electron donor.

The above-mentioned problems may be solved by this proposal, but, to the best of our knowledge, the performance of the product polymer is limited, the catalyst is degraded with the lapse of time and the ratio of the amount of the titanium component to the organoaluminum compound should be controlled at the polymerization. Therefore, further improvements are required.

As means for improving the impact strength, especially the impact strength at low temperatures, in crystalline polypropylene which is excellent in rigidity, heat resistance and the like, there is known a process in which propylene is copolymerized stepwise with ethylene or another olefin to form a block copolymer by, e.g. Japanese Patent Publictions No. 11,230/1968, No. 16,668/1969, No. 20,621/1969, No. 24,593/1974 and No. 30,264/1974 and Japanese Patent Application Laid-Open Specification No. 25,781/1973, No. 115,296/1975, No. 35,789/1978 and No. 110,072/1979.

When propylene is copolymerized with ethylene in at least two stages, the impact resistance is improved, but since the product contains a copolymerization component, the process involves an industrial problem in that a low crystallinity polymer of little value is formed as a by-product in a large quantity. Accordingly, various trials have been made to reduce the amount of the low crystallinity polymer formed as the by-product.

A catalyst based on titanium trichloride is well-known in the art as the catalyst for the stereoregular polymerization of olefins. However, the activity of this catalyst is not very high, and the catalyst-removing step may thus be necessary on the polymer produced.

The technique of introducing a magnesium compound into the solid catalyst component for enhancing the activity to such an extent that the catalyst-removing step will be unnecessary is known. Furthermore, the technique of using an electron donor as an ingredient of the solid catalyst component or as a polymerization additive for controlling formation of a low crystallinity component as a by-product is known by Japanese Patent Application Laid-Open Specifications No. 9,842/1972, No. 126,590/1975 and No. 57,789/1976.

Processes for preparing propylene block copolymers by using these catalyst systems have been proposed by, e.g. Japanese Patent Application Laid-Open Specifications No. 98,045/1977 and No. 88,049/1978. However, these processes may, to the best of our knowledge, be still insufficient from the practical viewpoint because a low crystallinity component may be formed in a large amount as a by-procut.

As means for overcoming this defect, there has been proposed a process in which an organic silicon compound having an Si—O—C or Si—O—N linkage is used as a polymerization additive by Japanese Patent Application Laid-Open Specification No. 83,016/1983, equivalent to U.S. Pat. No. 4,547,552. However, since the molecular weight of the rubbery portion formed which is an ethylene/propylene copolymer or the polyethylene portion is not very high, this process may involve the following problems:

(1) The formed rubber is easily extracted from the polymer and acts as a low crystallinity component formed as a by-product, and the formed polymer can get sticky and cohesion or sticking of the polymer can readily be caused. Therefore, an operation trouble often takes place.

(2) The impact resistance at low temperatures is not improved.

(3) In order to maintain MFR of the whole polymer at a high level, the molecular weight of the crystalline polypropylene portion should be inevitably increased. However, this increase results in degradation of the spiral flow, that is, the flowability of the polymer in a mold.

In the case where a polyolefin is prepared by the liquid phase polymerization, on the other hand, it is conventional to recycle a polymerization solvent used to the polymerization step after it has undergone the after-polymerization steps such as the catalyst removing step and a purification step such as distillation for removing polymerization by-products and water or an alcohol incorporated at the catalyst-removing step.

Since the manufacturing cost of a polyolefin is increased by this solvent purification, omission of the solvent purification step is desired. For this purpose, it is indispensable that the amounts of polymerization by-products should be sufficiently small and the step of removing water or an alcohol which acts as a poison to the catalyst should become unnecessary.

In fact, in the polymerization in which a catalyst based on titanium trichloride catalyst is used, recycle of a polymerization solvent while omitting the solvent purification step has been tried as shown in Japanese Patent Publication No. 96/1961 and Japanese Patent Application Laid-Open Specifications No. 83,784/1974 and No. 79,589/1975. So far as we know, however, in this process, the polymerization activity is reduced or increase of formation of by-products is caused as the polymerization solvent is utilized repeatedly, and the process is not industrially sufficient.

Various catalyst systems comprising a magnesium compound as a carrier for attaining such a high activity as rendering the catalyst removal unnecessary or comprising an electron donor as a third polymerization component for improving the stereoregularity and reducing formation of polymerization by-products have been reported. Moreover, there have been proposed processes in which these catalyst systems are used and the polymerization solvent is recycled to the polymerization step without the solvent purification step by Japanese Patent Application Laid-Open Specifications No. 31,910/1982 and No. 138,707/1983.

In these processes, to the best of our knowledge, the reaction of the electron donor as the third polymerization component with the organoaluminum compound component cannot be neglected and the polymerization stability is degraded, and if the recycle is repeated for a long time, the quality of the polymer becomes different from the quality of the initially formed polymer. Moreover, the polymerization activity is reduced by influences of the reaction product. Furthermore, the reaction product is accumulated and the smell of the polymer is worsened. Still further, the polymerization by-product is accumulated in the polymerization solvent while it is recycled, and the polymerization by-product is brought into the product polymer to reduce the properties of the product, such as the anti-blocking property and the rigidity, for example, in case of a film.

Japanese Patent Application Laid-Open Specification No. 138,715/1983, equivalent to U.S. Pat. No. 4,442,276 discloses a polymerization process in which an electron donor as the third polymerization component is not used. However, this process may be defective so far as we know in that the polymerization stability is poor and when the polymerization is conducted for a long time, the activity is reduced and formation of the polymerization by-product is increased. Furthermore, when the polymerization solvent is recycled and used repeatedly, the catalyst activity is similarly reduced.

SUMMARY OF THE INVENTION

In accordance with one aspect of the present invention, there is provided a catalyst for the polymerization of olefins, which comprises (A) a solid catalyst component obtained by contacting (i) a solid component comprising as essential ingredients titanium, magnesium and a halogen, which has preferably undergone preliminary polymerization of an olefin conducted thereon in the presence of an organoaluminum compound whereby a small amount of a polyolefin is deposited on it, with (ii) a silicon compound represented by the following formula:

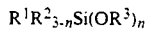

$$R^1R^2{}_{3-n}Si(OR^3)_n$$

wherein $R^1$ stands for a branched hydrocarbon residue, $R^2$ stands for a hydrocarbon residue which is the same as or different from $R^1$, $R^3$ stands for a hydrocarbon residue, and n is a number of from 1 to 3, and (B) an organoaluminum compound.

In accordance with another aspect of the present invention, there is provided a process for the preparation of propylene copolymers, which comprises carrying out in the presence of the above-mentioned catalyst the steps of (1) polymerizing propylene alone or a propylene/ethylene mixture having an ethylene content of up to 5% by weight in a single stage or multiple stages to form a polymer in an amount corresponding to 60 to 95% by weight of the total polymerization amount and (2) polymerizing a propylene/ethylene mixture having an ethylene content of 20 to 100% by weight in a single stage or multiple stages, whereby a propylene copolymer having a total ethylene content of 3 to 40% by weight is prepared.

In accordance with still another object of the present invention, there is provided a process for the preparation of olefin polymers, which comprises carrying out homopolymerization or copolymerization of olefins in the presence of the above-mentioned catalyst, and recycling a part or all of a solvent recovered after separation of a formed polymer from the reaction mixture to the polymerization step and using the solvent recovered.

When the catalyst for the polymerization of olefins according to the present invention is used, since an electron donor compound (external electron donor) need not be used at the polymerization, reduction of the polymerization velocity is not caused and even if the polymerization temperature is elevated, no trouble will arise. Thus, the problems involved in the known catalysts can be solved.

This characteristic is important for the catalyst and is advantageous from the industrial viewpoint. Although it has not been completely elucidated why the catalyst of the present invention has this excellent characteristic, it is assumed that one of the great reasons is that a specific silicon compound having a branched hydrocarbon residue is used. If known silicon compounds are used instead of this specific silicon compound, as described in detail hereinafter, the intended catalyst of the present invention cannot be obtained. Accordingly, it can be said that the present invention can attain excellent effects not expected from the known techniques.

According to the process of the present invention, a propylene copolymer, especially a propylene/ethylene copolymer, in which the molecular weight of the propylene/ethylene copolymer portion or the polyethylene portion is increased, that is, the rigidity and impact strength are improved, can be obtained with a high activity while controlling formation of a low crystallinity portion as a by-product.

Since the obtained copolymer powder is not sticky, an operation trouble due to agglomeration or sticking of the copolymer powder is not caused. Furthermore, since the durability of the activity of the catalyst used in the present invention is excellent, even if the operation is conducted for a long time, the catalyst activity is not reduced especially in the latter stage in the multi-staged polymerization, and the operation can be performed efficienty.

In the process of the present invention, since the molecular weight of the crystalline polypropylene portion in the obtained copolymer can be reduced, the flowability of the polymer (for example, the spiral flow) is improved. Moreover, since the catalyst system is simple in the present invention, control of the intended properties of the product can be easily accomplished.

Furthermore, since the activity of the catalyst of the present invention is high, no catalyst-removing step is necessary, and since the amount of a polymerization by-product is small, the polymerization solvent can be recycled to the polymerization step without the solvent purification step. Moreover, since no third polymerization component is used and no reaction of the third polymerization component with the organoaluminum compound need be taken into consideration, the recycling of the polymerization solvent to the polymerization step will not cause any deviation of the product quality and the operation can be performed stably, and adverse influences of the reaction product of the third component with the organoaluminum compound on the polymerization are eliminated. Accordingly, a polyolefin excellent in such properties in smell, rigidity, antiblocking property and transparency can be prepared at a low cost.

Still further, if the gas phase polymerization is carried out by using the catalyst of the present invention, no use of a third component at the polymerization also results in good polymerization stability and in good smell and hue characteristics of the product polymer, which are influenced by the third component.

DETAILED DESCRIPTION OF THE PREFERRED EMBODIMENTS

Catalyst

The catalyst of the present invention comprises specific components (A) and (B).

Component (A)

The component (A) of the catalyst of the present invention is a solid catalyst component obtained by contacting a component (i) described below with a component (ii) described below. Component (i):

A solid component comprising as essential ingredients titanium, magnesium and a halogen, used as the component (i), is a known solid component in the art of Ziegler-type catalysts. For example, there can be used solid components disclosed in Japanese Patent Application Laid-Open Specifications No.45,688/1978, No.3,894/1979, No.31,092/1979, No.39,483/1979, No.94,591/1979, No.118,484/79, No.131,589/1979, No.75,411/1980, No.90,510/1980, No.90,511/1980, No.127,405/1980, No.147,507/1980, No.155,003/1980, No.18,609/1981, No.70,005/1981, No.72,001/1981, No.86,905/1981, No.90,807/1981, No.155,206/1981, No.3,803/1982, No.34,103/1982, No.92,007/1982, No.121,003/1982, No.5,309/1983, No.5,310/1983, No.5,311/1983, No.8,706/1983, No.27,732/1983, No.32,604/1983, No.32,605/1983, No.67,703/1983, No.117,206/1983, No.127,708/1983, No.183,708/1983, No.183,709/1983, No.149,905/1984 and No.149,906/1984.

As the magnesium compound used as the magnesium source in the present invention, there can be mentioned a magnesium dihalide, a dialkoxy magnesium, an alkoxy magnesium halide, a magnesium oxyhalide, a dialkyl magnesium, magnesium oxide, magnesium hydroxide and a magnesium salt of a carboxylic acid, magnesium dihalide being preferable.

As the titanium compound used as the titanium source, there can be mentioned compounds represented by the following formula:

$$Ti(OR^4)_{4-n}X_n$$

wherein $R^4$ stands for a hydrocarbon residue, preferably a hydrocarbon residue having 1 to about 10 carbon atoms, X stands for a halogen atom and n is a number of from 0 to 4.

As specific examples, there can be mentioned $TiCl_4$, $TiBr_4$, $Ti(OC_2H_5)Cl_3$, $Ti(OC_2H_5)_2Cl_2$, $Ti(OC_2H_5)_3Cl$, $Ti(O-i-C_3H_7)Cl_3$, $Ti(O-n-C_4H_9)Cl_3$, $Ti(O-n-C_4H_9)_2Cl_2$, $Ti(OC_2H_5)Br_3$, $Ti(OC_2H_5)(OC_4H_9)_2Cl$, $Ti(O-n-C_4H_9)_3Cl$, $Ti(O-C_6H_5)Cl_3$, $Ti(O-i-C_4H_9)_2Cl_2$, $Ti(OC_5H_{11})Cl_3$, $Ti(OC_6H_{13})Cl_3$, $Ti(OC_2H_5)_4$, $Ti(O-n-C_3H_7)_4$, $Ti(O-n-C_4H_9)_4$, $Ti(O-i-C_4H_9)_4$, $Ti(O-n-C_6H_{13})_4$, $Ti(O-n-C_8H_{17})_4$ and $Ti[OCH_2CH(C_2H_5)C_4H_9]_4$. Among these titanium compounds, $TiCl_4$, $Ti(OC_2H_5)Cl_3$, $Ti(O-n-C_4H_9)Cl_3$ and $Ti(OC_2H_5)_4$ are preferred, and $TiCl_4$ and $Ti(O-n-C_4H_9)_4$ are more preferred.

Molecular compounds formed by reaction of $TiX'_4$ (in which $X'$ stands for a halogen atom) with an electron donor can also be used. As specific examples, $TiCl_4\cdot CH_3COC_2H_5$, $TiCl_4\cdot CH_3CO_2C_2H_5$, $TiCl_4\cdot C_6H_5NO_2$, $TiCl_4\cdot CH_3COCl$, $TiCl_4\cdot C_6H_5COCl$, $TiCl_4\cdot C_6H_5CO_2C_2H_5$, $TiCl_4\cdot ClCOC_2H_5$ and $TiCl_4\cdot C_4H_4O$ can be mentioned.

In addition to the foregoing essential ingredients, the solid component used in the present invention can comprise another ingredient, for example, a silicon compound such as $SiCl_4$, $CH_3SiCl_3$, $HSiCl_3$, $H(CH_3)SiCl_2$, $H[Si(CH_3)_2O]_2Si(CH_3)_2H$, methylhydrogen polysiloxane, 1,3,5,7-tetramethylcyclotetrasiloxane and 1,3,5,7,9-pentamethylcyclopentasiloxane; an aluminum compound such as $Al(O-i-C_3H_8)_3$, $AlCl_3$, $AlBr_3$, $Al(OC_2H_5)_3$ and $Al(OCH_3)_2Cl$; or a boron compound such as $B(OCH_3)_3$, $B(OC_2H_5)_3$ and $B(OC_6H_5)_b$ 3, and these ingredients can be left as the silicon, aluminum and boron ingredients in the solid catalyst component.

The halogen is ordinarily supplied by the above-mentioned magnesium halide and/or titanium halide, but a known halogenating agent such as an aluminum halide, a silicon halide or a phosphorus halide may be used as the halogen source.

As the halogen contained in the solid catalyst component, there can be mentioned fluorine, chlorine, bromine, iodine and a mixture thereof, and chlorine is especially preferred.

The solid component can be prepared by using an electron donor compound as an internal electron donor.

As the electron donor (internal donor) used for the preparation of the solid component, there can be used oxygen-containing electron donors such as alcohols, phenols, ketones, aldehydes, carboxylic acids, esters of organic acids and inorganic acids, ethers, acid amides and acid anhydrides; and nitrogen-containing electron donors such as ammonia, amines, nitriles and isocyanates.

More specifically, there can be mentioned alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol and isopropylbenzyl alcohol; phenols having 6 to 25 carbon atoms, which can have an alkyl group, such as phenol, cresol, xylenol, ethylphenol, propylphenol, cumylphenol, nonylphenol and naphthol; ketones having 3 to 15 carbon atoms, such as acetone, methylethylketone, methylisobutylketone, acetophenone and benzophenone; aldehydes having 2 to 15 carbon atoms such as acetaldehyde, propionaldehyde, octylaldehyde, benzaldehyde, tolualdehyde and naphthaldehyde; esters of an organic acid having 2 to 20 carbon atoms such as methyl formate, methyl acetate, ethyl acetate, vinyl acetate, propyl acetate, octyl acetate, cyclohexyl acetate, ethyl propionate, methyl butyrate, ethyl valeate, ethyl stearate, methyl chloroacetate, ethyl dichloroacetate, methyl methacrylate, ethyl crotonate, ethyl cyclohexane-carboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, cumarine, phthalide, ethylene carbonate, cellosolve acetate, Methylcellosolve acetate, n-Butylcellosolve acetate, Cellosolve isobutyrate and Cellosolve benzoate; esters of an inorganic acid such as ethyl silicate, butyl silicate, phenyltriethoxysilane and other silicic acid esters; acid halides having 2 to 15 carbon atoms such as acetyl chloride, benzoyl chloride, toluoyl chloride, anisoyl chloride, phthaloyl chloride and isophthaloyl chloride; ethers having 2 to 20 carbon atoms such as methyl ether, ethyl ether, isopropyl ether, butyl ether, amyl ether, tetrahydrofuran, anisole and diphenyl ether; acid amides such as acetic acid amide, benzoic acid amide and toluylic acid amide; amines such as methylamines, ethylamines, diethylamine, tributylamine, piperidine, tribenzylamine, aniline, pyridine, picoline and tetramethyl ethylene diamine; and nitriles such as acetonitrile, benzonitrile and tolunitrile. A mixture of two or more of these electron donors can be used.

The more preferable as the internal electron donor are esters of an organic acid or acid halides, and the most preferable are esters of phthalic acid, phthaloyl halides and Cellosolve acetate.

The amounts used of the respective ingredients are not particularly critical, so far as the intended effects of the present invention are attained. However, the amounts described below are generally preferred.

The titanium compound is used in such an amount that the molar ratio to the amount used of the magnesium compound is $1 \times 10^{-4}$ to 1,000, preferably 0.01 to 10. When the halogenating agent is used, the molar ratio of the amount of the halogenating agent to the amount used of the magnesium compound is $1 \times 10^{-2}$ to 1,000, preferably 0.1 to 100, irrespective of whether or not the titanium compound and/or the magnesium compound contains a halogen. The amount used of each of the silicon, aluminum and boron compounds is such that the molar ratio to the amount used of the magnesium compound is $1 \times 10^{-3}$ to 100, preferably 0.01 to 1.

The amount used of the electron donor compound is such that the molar ratio to the amount used of the magnesium compound is $1 \times 10^{-3}$ to 10, preferably 0.01 to 5.

The solid component used in the present invention can be prepared according to known methods, preferably the methods described below. Specific examples of the compounds referred to in the following description are those as described above.

(a) A magnesium dihalide is contacted with an electron donor and a ritanium-containing compound, and, if necessary, the contact product is treated with a solvent.

(b) Alumina or magnesia is treated with a phosphorus halide compound and is then contacted with a magnesium halide, an electron donor and a halogen-containing titanium compound.

(c) A magnesium halide is contacted with a titanium tetra alkoxide and a polymeric silicon compound represented by the followng formula:

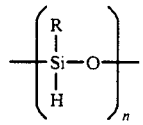

wherein R stands for a hydrocarbon residue having 1 to 10 carbon atoms, preferably 1 to 6 carbon atoms, and n is a degree of polymerization, which is preferably such that the polymer has a viscosity of 0.1 to 100 centistokes (cSt) and the obtained solid component is contacted with (i) a halogen-containing titanium compound and/or a silicon halide or with (ii) silicon halide and phosphorus chloride, if necessary together with an electron donor.

(d) A magnesium compound is dissolved by means of a titanium tetra-alkoxide and an electron donor, a solid component is precipitated from the solution by a titanium- and halogen-compound or halogenating agent, and the solid component is contacted with a titanium compound.

(e) An organic magnesium compound such as a Grignard reagent is reacted with a halogenating agent and a reducing agent and the reaction product is contacted with an electron donor and a titanium compound.

(f) A magnesium alkoxide is contacted with a halogenating agent and/or a titanium compound in the presence or absence of an electron donor.

Thus, a solid component comprising titanium, magnesium and a halogen as essential ingredients is obtained.

The so-obtained solid component can be used directly as the solid component (i), but it is preferred that a solid component obtained by contacting the so-obtained solid component with an olefin in the presence of an organoaluminum compound to effect on it a preliminary polymerization be used as the component (i). The solid component (i) thus can have a polymer of an olefin deposited thereon in an amount of 0 to 50 g per gram of the solid component (i).

The conditions for the preliminary polymerization of the olefin for obtaining the component (i) are not particularly critical, but it is generally preferred that the preliminary polymerization be carried out under conditions: the polymerization temperature is 0° to 80° C., especially 10° to 60° C.; and the olefin is polymerized in an amount of 0.001 to 50 g, especially 0.1 to 10 g, per g of the solid component.

Any organoaluminum compounds known as a component in Ziegler-type catalysts can be used for the preliminary polymerization. For example, there can be mentioned $Al(C_2H_5)_3$, $Al(i-C_4H_9)_3$, $Al(C_6H_{13})_3$, $Al(C_8H_{17})_3$, $Al(C_{10}H_{21})_3$, $Al(C_2H_5)_2Cl$, $Al(i-C_4H_9)_2Cl$, $Al(C_2H_5)_2H$, $Al(i-C_4H_9)_2H$, and $Al(C_2H_5)_2(OC_2H_5)$.

Among these organoaluminum compounds, $Al(C_2H_5)_3$ and $Al(i-C_4H_9)_3$ are especially preferred. Furthermore, a combination of a trialkylaluminum and an alkylaluminum halide and a combination of a trialkylaluminum, an alkylaluminum halide and an alkylaluminum ethoxide are effective. For example, there can be mentioned a combination of $Al(C_2H_5)_3$ and $Al(C_2H_5)_2Cl$, a combination of $Al(i-C_4H_9)_3$ and $Al(i-C_4H_9)_2Cl$, a combination of $Al(C_2H_5)_3$ and $Al(C_2H_5)_{1.5}Cl_{1.5}$, and a combination of $Al(C_2H_5)_3$, $Al(C_2H_5)_2Cl$ and $Al(C_2H_5)_2(OC_2H_5)$.

The amount of the organoaluminum compound used for the preliminary polymerization to the amount of the Ti component in the solid catalyst component (A) is such that the Al/Ti molar ratio is from 1 to 20, preferably from 2 to 10. At the preliminary polymerization, a known electron donor such as an alcohol, an ester or a ketone may be added in addition to the organoaluminum compound.

As the olefin used for the preliminary polymerization, there can be mentioned ethylene, propylene, 1-butene, 1-hexene and 4-methylpentene-1. Hydrogen may be present at the preliminary polymerization.

Thus, the component (i) which has undergone the preliminary polymerization is obtained by contacting the solid component comprising titanium, magnesium and a halogen as essential ingredients with an olefin in the presence of an organoaluminum compound. Component (ii):

The component (ii) to be contacted with the above-mentioned component (i) for preparing the solid catalyst component (A) of the present invention is a silicon compound represented by the following formula:

$$R^1R^2{}_{3-n}Si(OR^3)_n$$

wherein $R^1$ stands for a branched hydrocarbon residue, $R^2$ stands for a hydrocarbon residue, which may be the same as or different from $R^1$, $R^3$ stands for a hydrocarbon residue, and n is a number of from 1 to 3.

It is preferred that $R^1$ be branched from the carbon atom adjacent to the silicon atom, and in this case, it is preferred that the branch group be an alkyl group, a cycloalkyl group, or an aryl group such as for example, a phenyl group or a methyl-substituted phenyl group. Furthermore, it is preferred that in $R^1$, the carbon atom adjacent to the silicon atom, that is, the carbon atom at the α-position, be a secondary or tertiary carbon atom. It is especially preferred that the carbon atom bonded to the silicon atom is a tertiary carbon atom. The $R^1$ is ordinarily of 3 to 20 carbon atoms, preferably 4 to 10 carbon atoms. Generally, $R^2$ is a branched or linear aliphatic hydrocarbon group having 1 to 20 carbon atoms, preferably 1 to 10 carbon atoms. $R^3$ is ordinarily an aliphatic hydrocarbon group, preferably a linear aliphatic hydrocarbon group having 1 to 4 carbon atoms.

Specific examples of the component (ii) include:

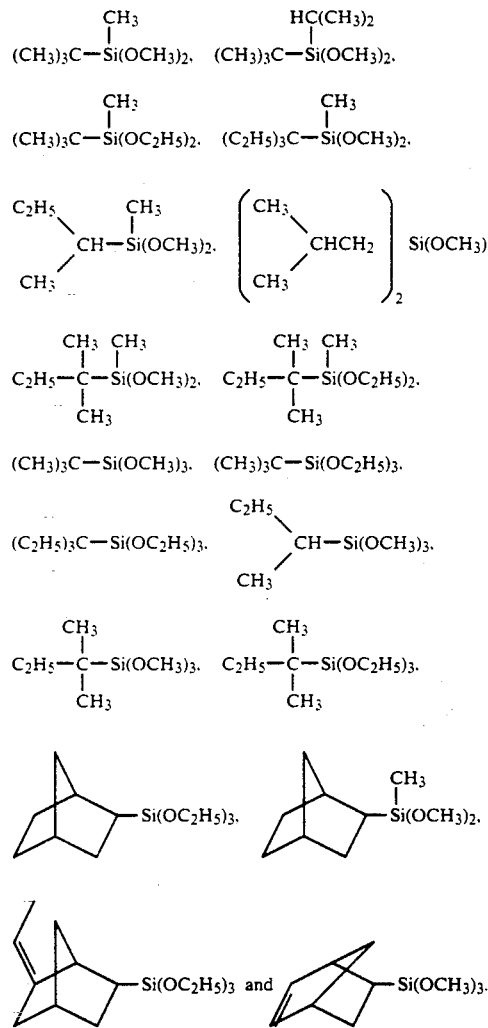

Contact of the components (i) and (ii):

The conditions for contacting the component (i) with the component (ii) are not particularly critical, so far as the intended effects of the present invention can be attained, but conditions described below are ordinarily preferred. The contact temperature is about −50° to about 200° C., preferably 0° to 100° C. As the contacting method, there can be mentioned a mechanical method in which a rotary ball mill, a vibrating mill, a jet mill or a medium stirring pulverizer is used, and a method in which the contact is effected by stirring in the presence of an inert diluent. As the inert diluent, there can be mentioned an aliphatic or aromatic hydrocarbon, a halogenated hydrocarbon and a polysiloxane.

The amounts of the components (i) and (ii) to be contacted with each other are such that the atomic ratio, silicon/titanium, of silicon of the component (ii) to titanium of the component (i) is from 0.01 to 1,000, preferably from 0.1 to 100.

Component (B)

The component (B) is an organoaluminum compound. For example, there can be used organoaluminum compounds represented by the following general formula:

$$R^5{}_{3-n}AlX_n \text{ or } R^6{}_{3-m}Al(OR^7)_m$$

wherein $R^5$ and $R^6$, which may be the same or different, each stand for a hydrocarbon residue having 1 to about 20 carbon atoms or a hydrogen atom, $R^7$ stands for a hydrocarbon residue, X stands for a halogen atom, n is a number of $0 \leq n < 3$, and m is a number of $0 < m < 3$.

As specific examples, there can be mentioned (a) trialkylaluminum compounds such as trimethylaluminum, triethylaluminum, tri-isobutylaluminum, trihexylaluminum, trioctylaluminum and tridecylaluminum, (b) alkylaluminum halides such as diethylaluminum monochloride, diisobutylaluminum monochloride, ethylaluminum sesquichloride and ethylaluminum dichlorde, (c) alkylaluminum hydrides such as diethylaluminum hydride and di-isobutylaluminum hydride and (d) aluminum alkoxides such as diethylaluminum ethoxide and diethylaluminum phenoxide.

In combination with the organoaluminum compounds (a) through (c), there may be used other organometal compounds such as alkylaluminum alkoxides represented by the following formula:

$$R^8{}_{3-a}Al(OR^9)_a$$

wherein a is a number of from 1 to 3, and $R^8$ and $R^9$, which may be the same or different, each stand for a hydrocarbon residue having 1 to about 20 carbon atoms.

For example, there can be mentioned a combination of triethylaluminum and diethylaluminum ethoxide, a combination of diethylaluminum monochloride and diethylaluminum ethoxide, a combination of ethylaluminum dichloride and ethylaluminum diethoxide, and a combination of triethylaluminum, diethylaluminum ethoxide and diethylaluminum chloride.

The amount used of the component (B) is such that the component (B)/component (A) weight ratio is from 0.1 to 1000, preferably from 1 to 100.

Polymerization

The catalyst of the present invention is used for not only slurry polymerization but also liquid phase solvent-free polymerization, solution polymerization or gas phase polymerization. Furthermore, the catalyst of the present invention can be used for continuous polymerization, batchwise polymerization or polymerization including preliminary polymerization.

In case of the slurry polymerization, there can be used as the polymerization solvent saturated aliphatic hydrocarbons and aromatic hydrocarbons such as hexane, heptane, cyclohexane, benzene, toluene and mixtures thereof. The polymerization temperature is room temperature to about 200° C., preferably 50° to 150° C., and the polymerization pressure is atmospheric pressure to about 100 Kg/cm², preferably 1 to 50 Kg/cm². Hydrogen can be used for adjusting the molecular weight of the polymer to be produced.

In case of the slurry polymerization, the slurry obtained is degasified after the polymerization according to need, and the slurry is separated into the insoluble polymer and the polymerization solvent by filtration, centgrifugation, counter current extraction, or by means of a liquid cyclone. A part or all of the solvent separated from the slurry can be recycled to the polymerization step and used again.

The olefin polymerized by the catalyst system of the present invention is represented by the following general formula:

$$R-CH=CH_2$$

wherein R stands for a hdrogen atom or a hydrocarbon residue having 1 to 10 carbon atoms, which can have a branched group.

As specific examples, there can be mentioned ethylene, propylene, butene-1, pentene-1, hexene-1 and 4-methylpentene-1, and ethylene and propylene are preferred. Ethylene may be copolymerized with up to 50% by weight, preferably up to 20% by weight, of an olefin as described above, and propylene may be copolymerized with up to 30% by weight of an olefin as described above, especially ethylene. Furthermore, copolymerization with other copolymerizable monomer (for example, vinyl acetate or a diolefin) may be carried out.

A propylene/ethylene block copolymer can be prepared by conducting at least the following two steps (1) and (2) in two stages in the presence of the above-mentioned catalyst of the present invention, preferably in the order of the step (1) to the step (2).

Step (1)

Propylene alone or a propylene/ethylene mixture having an ethylene content of up to 5% by weight, preferably up to 0.5% by weight, is supplied to the polymerization system where the above-mentioned catalyst is present and the polymerization is carried out in a single stage or multiple stages to form a polymer in an amount corresponding to 60 to 95% by weight of the total polymerization amount.

At the step (1), if the ethylene content in the propylene/ethylene mixture exceeds the above-mentioned upper limit, the bulk density of the final copolymer is reduced and the amount of a low crystallinity polymer formed as a by-product is increased. Furthermore, if the polymerization quantity is below the above-mentioned range, similar phenomena are caused. If the polymerization ratio exceeds the above-mentioned range, the amount of a low crystallinity polymer formed as a by-product is reduced, but the improvement of the impact strength, which is the object to be attained by formation of the block copolymer, is hardly attained.

The polymerization temperature at the step (1) is 30 to 90° C., preferably 50° to 80° C., and the polymerization pressure is about 1 to about 40 Kg/cm².

In order to impart a good flowability to the final polymer, it is preferred that a molecular weight modifier be used at the step (1). Hydrogen can be mentioned as a preferred molecular weight modifier.

Step (2)

Subsequently to the step (1), a propylene/ethylene mixture having an ethylene content of 20 to 100% by weight is introduced and is polymerized in a single stage or multiple stages to form a polymer in an amount corresponding to 5 to 40% by weight of the amount of the total polymer.

If the polymerization quantity at the step (2) is below the above-mentioned range, the impact resistance is reduced, and if the polymerization quantity exceeds the above-mentioned range, the amount of a low crystallinity polymer formed as a by-product is drastically increased and the viscosity of the polymerization solvent is increased to cause an operation trouble.

Other comonomer can be present at the step (2). For example, there can be mentioned α-olefins such as 1-butene, 1-pentene and 1-hexene.

The polymerization temperature at the step (2) is 30° to 90° C., preferably 50° to 80° C., and the polymerization pressure is about 1 to about 40 Kg/cm$^2$.

It is preferred that when the step (1) is changed over to the step (2), the propylene gas or propylene/ethylene mixture gas and the hydrogen gas be purged and the step (2) be then conducted.

A molecular weight modifier can be used at the step (2) according to need. For example, in the case where the impact resistance of the final polymer is important, it is preferred that the polymerization be carried out substantially in the absence of a molecular weight modifier. On the other hand, in the case where the transparency, gloss and prevention of whitening are important, it is preferred that the polymerization be carried out in the presence of a molecualr weight modifier.

Polymerization Process

The production of the block copolymer according to the present invention can be carried out batchwise, continuously or semi-batchwise. For example, there can be adopted a process in which the polymerization is carried out in a liquid medium of an inert hydrocarbon solvent such as heptane, a process in which the monomer to be polymerized is used as the liquid medium, a process in which no medium is used but gaseous monomers are polymerized, and a process comprising two or more of the foregoing processes in combination.

The catalyst of the present invention can also be applied to the gas phase polymerization. In this case, the polymerization can be carried out continuously, batchwise or in multiple stages. The polymerization temperature is room temperature to about 100° C., preferably 50° to 90° C., and hydrogen can be used as a molecular weight modifier. In case of the gas phase polymerization, the polymerization pressure is atmospheric pressure to about 50 Kg/cm$^2$. In order to remove the polymerization heat, there may be adopted a method in which an easily volatile liquid hydrocarbon such as propane or butane is supplied and gasified in the polymerization zone.

The present invention will now be described in detail with reference to the following examples that by no means limit the scope of the invention.

EXAMPLE 1

Preparation of Component (A)

A ball mill having a volume of 0.4 liter whose inside was sufficiently dried and was substituted by nitrogen was filled with 40 pieces of stainless steel balls having a diameter of 12 mm. and 30 g of MgCl$_2$ and 23.3 ml of diheptyl phthalate were introduced into the ball mill and pulverized for 48 hours by the rotating ball mill. After completion of the pulverization, the mixed pulverized composition was taken out from the mill in a dry box, and 26.4 g of the pulverized composition was introduced into a sufficiently nitrogen-substituted flask and 25 ml of n-heptane and 75 ml of TiCl$_4$ were introduced into the flask. Reaction was carried out at 100° C. for 3 hours. After completion of the reaction, the reaction product was sufficiently washed with n-heptane. A part of the solid component obtained was sampled and analyzed, and it was found that the solid product obtained was a solid component comprising titanium, magnesium and the halogen as essential ingredients and having a Ti content of 3.12% by weight.

A stainless steel vessel provided with a stirrer and a temperature-controlling device and having an inner volume of 1.5 liters was charged with 500 ml of sufficiently dehydrated and deoxygenated n-heptane, 4.2 g of triethylaluminum and 20 g of the obtained solid component. While the temperature in the stirred vessel was maintained at 20° C., propylene was introduced at a constant rate and propylene was polymerized for 30 minutes. After termination of the polymerization, the reaction product was sufficiently washed with n-heptane. A part of the reaction product was sampled, the polymerized amount of propylene was examined and it was found that in the component (i) obtained, propylene was polymerized in an amount of 0.97 g per g of the solid component.

A flask whose inside was fully substituted by nitrogen was charged with 50 ml of purified n-heptane, and 5 g of the component (i) obtained was introduced and then, 0.34 ml of $(CH_3)_3CSi(CH_3)(OCH_3)_2$ as the silicon compound as the component (ii) was introduced. The contact was effected at 30° C. for 2 hours. After termination of the contact, the contact product was sufficiently washed with n-heptane to obtain the component (A). A part of the component (A) obtained was sampled and analyzed, and it was found that the Si/Ti atomic ratio was 0.37.

Polymerization of Propylene

A stainless steel autoclave provided with a stirrer and a temperature-controlling device and having an inner volume of 1.5 liters was charged with 500 ml of sufficiently dehydrated and deoxygenated n-heptane, 125 mg of triethyl aluminum as the component (B) and 15 mg, exclusive of the polymer formed by the preliminary polymerization, of the above-mentioned component (A).

Then, 60 ml of hydrogen was introduced into the autoclave, and the temperature and pressure were elevated. Polymerization of propylene was carried out under conditions of a polymerization pressure of 5 Kg/cm$^2$G, a polymerization temperature of 75° C. and a polymerization time of 2 hours. After termination of the polymerization, the polymer slurry obtained was separated by filtration, and the polymer was dried to obtain 125.1 g of a dry polymer. Separately, 1.2 g of a polymer was recovered from the filtrate. From the results of the boiling heptane extraction test, it was found that the total polymer I.I, which is hereinafter referred to as "T-I.I", was 97.1% by weight. MFR was 2.9 g/10 min and the bulk density of the polymer was 0.40 g/cc.

EXAMPLE 2

Preparation of Component (A)

A flask whose inside was sufficiently substituted by nitrogen was charged with 200 ml of dehydrated and deoxygenated n-heptane, and 0.4 mole of $MgCl_2$ and 0.8 mole of $Ti(O-n-C_4H_9)_4$ were introduced and reaction was carried out at 95° C. for 2 hours. After completion of the reaction, the temperature was lowered to 40° C. and 48 ml of methylhydropolysiloxane (20 cSt) was introduced. Reaction was carried out for 3 hours. The solid component formed was washed with n-heptane.

Then, in the same manner as described in Example 1, a flask whose inside was sufficiently substituted by nitrogen was char9ed with 50 ml of purified n-heptane, and the solid component synthesized as shown above was introduced in an amount of 0.24 mole as calculated as Mg. Then, a mixture of 25 ml of n-heptane and 0.4 mole of $SiCl_4$ was introduced into the flask at 30° C. over a period of 30 minutes and reaction was carried out at 70° C. for 3 hours. After termination of the reaction, the reaction product was washed with n-heptane. Then, a mixture of 25 ml of n-heptane and 0.016 mole of diheptyl phthalate was charged into the flask at 70° C. over a period of 30 minutes, and reaction was carried out at 70° C. for 1 hour. After termination of the reaction, the reaction product was washed with n-heptane. Then, 100 ml of $TiCl_4$ was introduced into the flask and reaction was carried out at 100° C. for 3 hours. After completion of the reaction, the reaction product was sufficiently washed with n-heptane. The titanium content in the reaction product obtained was 2.61% by weight. The reaction product was used is, the solid component for the production of the solid component (i).

The component (i) was prepared in the same manner as described in Example 1 except that the so-obtained solid component was used. In the obtained component (i), the amount of preliminarily polymerized propylene was 1.02 g per g of the solid component.

The component (i) was contacted with the component (ii) in the same manner as described in Example 1 except that the amount of the silicon compound used as the component (ii) was changed to 0.81 ml. After termination of the contact, the contact product was sufficiently washed with n-heptane to obtain the component (A). A part of the component (A) was sampled and analyzed, and it was found that the Si/Ti atomic ratio was 0.52.

Polymerization of Propylene

Polymerization was carried out under the same conditions as descirbed in Example 1 except that the amount of triethylaluminum used as the component (B) was changed to 250 mg.

As the result, 201.5 g of a polymer was obtained, and MFR was 2.7 g/10 min, T-I.I was 98.2% by weight and the bulk density was 0.45 g/cc.

EXAMPLE 3

Preparation of Component (A)

In the production of the component (A) of Example 2, the solid component was prepared in the same manner as described in Example 2 except that phthaloyl chloride was used instead of diheptyl phthalate and the amount used of $TiCl_4$ was changed to 25 ml. The titanium content in the solid component obtained was 2.58% by weight.

By using the so-prepared solid component, the preliminary polymerization was carried out in the same manner as described in Example 1 except that the amount used of triethylaluminum was changed to 3.0 g. The amount of polymerized propylene in the component (i) obtained was 0.99 g per g of the solid component.

The component (i) was contacted with the component (ii) in the same manner as described in Example 1 except that the amount of the silicon compound used as the component (ii) was changed to 1.6 ml and the so-obtained component (i) was used. After termination of the contact, the contact product was sufficiently washed with n-heptane to obtain the component (A). A part of the component (A) was sampled and analyzed, and it was found that the Si/Ti atomic ratio was 1.05.

Polymerization of Propylene

Polymerization of propylene was carried out in the same manner as described in Example 1 except that the above-mentioned component (A) was used and the polymerization temperature was changed to 80° C. As the result, 199.4 g of a polymer was obtained, and MFR was 2.2 g/10 min, T-I.I was 98.9% by weight and the bulk specific gravity was 0.48 g/cc.

EXAMPLES 4 THROUGH 10B

A catalyst was prepared and propylene was polymerized in the same manner as described in Example 2 except that in the production of the component (A), a compound shown in Table 1 was used instead of $(CH_3)_3CSi(CH_3)(OCH_3)_2$ used in Example 2 as the silicon compound as the component (ii). The results obtained are shown in Table 1.

TABLE 1

| Example No. | Silicon Compound | Yield (g) of Polymer | MFR (g/10 min.) | Bulk Density of Polymer (g/cc) | T-I.I (% by wt.) |
|---|---|---|---|---|---|
| 4 | $(CH_3)_3C-Si(OCH_3)_3$ | 146 | 3.8 | 0.45 | 97.3 |
| 5 | $(CH_3)_3C-Si(OC_2H_5)_3$ | 138 | 4.4 | 0.44 | 97.1 |
| 6 | $(C_2H_5)_3C-Si(OC_2H_5)_3$ | 137 | 4.2 | 0.46 | 97.0 |
| 7 | $(CH_3)_3C-Si(CH_3)_2(OCH_3)$ | 171 | 2.1 | 0.45 | 96.5 |
| 8 | $(C_6H_5)C(CH_3)_2-Si(OC_2H_5)_3$ | 160 | 3.0 | 0.44 | 97.2 |
| 9 | $(CH_3)_3C-Si-CH(CH_3)_2(OCH_3)_2$ | 153 | 2.9 | 0.44 | 97.3 |
| 10 | $(CH_3)_3C-Si(CH_3)(OC_2H_5)_2$ | 162 | 2.8 | 0.45 | 97.4 |
| 10a | 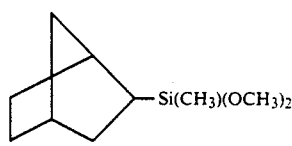 $-Si(CH_3)(OCH_3)_2$ | 174 | 4.3 | 0.45 | 97.1 |

TABLE 1-continued

| Example No. | Silicon Compound | Yield (g) of Polymer | MFR (g/10 min.) | Bulk Density of Polymer (g/cc) | T-I.I (% by wt.) |
| --- | --- | --- | --- | --- | --- |
| 10b | (structure)—Si(OC$_2$H$_5$)$_3$ | 166 | 5.9 | 0.45 | 96.3 |

EXAMPLES 11 THROUGH 15

Propylene was polymerized in the same manner as described in Example 3 except that an organoaluminum compound shown in Table 2 was used as the organoaluminum compound as the component instead of triethylaluminum used in Example 3. The results obtained are shown in Table 2.

TABLE 2

| Example No. | Organoaluminum Compound [Component (B)] | Yield (g) of Polymer | MFR (g/10 min.) | Bulk Density of Polymer (g/cc) | T-I.I (% by weight) |
| --- | --- | --- | --- | --- | --- |
| 11 | tri-isobutyl-aluminuim. 217 mg | 189 | 2.1 | 0.46 | 98.7 |
| 12 | trihexyl-aluminum. 132 mg | 193 | 2.3 | 0.46 | 98.5 |
| 13 | diethyl-aluminum chloride. 132 mg | 116 | 3.1 | 0.47 | 97.4 |
| 14 | triethyl-aluminum. 75 mg diethyl-aluminum chloride. 25 mg | 236 | 1.9 | 0.46 | 98.6 |
| 15 | diethyl-aluminum hydride. 95 mg | 201 | 2.2 | 0.46 | 98.5 |

EXAMPLE 16

Preparation of Component (A)

A flask whose inside was sufficiently substituted by nitrogen was charged with 200 ml of dehydrated and deoxygenated n-heptane, and 0.4 mole of MgCl$_2$ and 0.8 mole of Ti(O—n—C$_4$H$_9$)$_4$ were introduced into the flask and reaction was carried out at 95° C. for 2 hours. After termination of the reaction, the temperature was lowered to 35° C., and 60 ml of 1,3,5,7-tetramethylcyclotetrasiloxane was introduced and reaction was carried out for 5 hours. The solid component formed was washed with n-heptane.

Then, a flask whose inside was sufficiently substituted by nitrogen was charged with 100 ml of n-heptane, and the solid component synthesized above was introduced into the flask in an amount of 0.12 mole as calculated as the Mg atom. Then, 0.24 mole of SiCl$_4$ was introduced at 20° C. over a period of 30 minutes and reaction was carried out at 50° C. for 3 hours. After termination of the reaction, the reaction product was washed with n-heptane to obtain the solid component for the production of the component (i). The titanium content in the solid component was 4.48% by weight.

The component (i) which had undergone the preliminary polymerization was prepared in the same manner as described in Example 2 except that the so-obtained solid component was used and the preliminary polymerization temperature was changed to 15° C. In the component (i) obtained, the amount of polymerized propylene was 1.01 g per g of the solid component.

The so-obtained component (i) was contacted with the component (ii) in the same manner as described in Example 1 except that the amount of the silicon compound used as the component (ii) was changed to 1.9 ml. After termination of the contact, the contact product was sufficiently washed with n-heptane to obtain the component (A).

Polymerization of Propylene

Propylene was polymerized under the same conditions as adopted in Example 2 except that the amount used of triethylaluminum was changed to 63 mg and the polymerization temperature was chagned to 70° C. As the result, 107 g of a polymer was obtained, and MFR was 4.7 g/10 min. T-I.I was 95.6% by weight and the bulk density of the polymer was 0.46 g/cc.

EXAMPLE 17

The component (A) was prepared in the same manner as described in Example 2 except that ethyl benzoate was used instead of diheptyl phthalate. By using the so-obtained component (A), propylene was polymerized in the same manner as described in Example 2. As the result, 95.6 g of a polymer was obtained, and MFR was 4.8 g/10 min, T-I.I was 94.3% by weight and the bulk density of the polyemr was 0.43 g/cc.

COMPARATIVE EXAMPLES 1 THROUGH 7

The component (A) was prepared in the same manner as described in Example 2 except that a compound shown in Table 3 was used as the silicon compound as the component (ii), and by using the so-obtained component (A), propylene was polymerized in the same manner as described in Example 2. The obtained results are shown in Table 3.

TABLE 3

| Comp. Exam. No. | Silicon Compound | Yield (g) of Polymer | MFR (g/10 min) | Bulk Density of Polymer (g/cc) | T-I.I (% by wt) |
| --- | --- | --- | --- | --- | --- |
| 1 | not used | 136 | 19.4 | 0.41 | 70.2 |
| 2 | (C$_6$H$_5$)$_2$Si(OCH$_3$)$_2$ | 121 | 10.6 | 0.42 | 90.2 |
| 3 | (CH$_3$)Si(OC$_2$H$_5$)$_3$ | 92 | 16.7 | 0.41 | 83.4 |
| 4 | (C$_6$H$_5$)Si(OC$_2$H$_5$)$_3$ | 106 | 32.3 | 0.44 | 90.8 |
| 5 | (C$_6$H$_{11}$)Si(OCH$_3$)$_3$ | 101 | 15.8 | 0.42 | 87.5 |
| 6 | (C$_6$H$_5$)Si(OCH$_3$)$_3$ | 97 | 30.1 | 0.43 | 80.6 |
| 7 | (CH$_3$)Si(OCH$_3$)$_2$ | 88 | 41.4 | 0.40 | 77.4 |

COMPARATIVE EXAMPLE 8

The component (A) was prepared in the same manner as described in Example 1 except that when the component (i) was prepared with the preliminary polymerization conducted, the silicon compound as the component (ii) was simultaneously added, and by using the so-obtained component (A), propylene was polymerized in the same manner as described in Example 1. As the result, 88g of a polymer was obtained, and MFR was 21.7 g/10 min, T-I.I was 73.1% by weight and the bulk density of the polymer was 0.36 g/cc.

EXAMPLE 18

Preparation of Component (A)

A ball mill whose inside was sufficiently dried and substituted by nitrogen having a capacity of 0.4 liter was filled with 40 pieces of stainless steel balls having a diameter of 12 mm, and 20 g of $MgCl_2$ and 15.5 ml of diheptyl phthalate were introduced into the ball mill and pulverized for 48 hours by the rotating ball mill. After termination of the pulverization, the mixed pulverized composition was taken out from the mill in a dry box. Then, 8.8 g of the pulverized composition was charged in a flask sufficiently substituted with nitrogen and 25 ml of n-heptane and 25 ml of $TiCl_4$ were introduced into the flask and reaction was carried out at 100° C. for 3 hours. After termination of the reaction, the reaction product was sufficiently washed with n heptane. A part of the obtained solid component [component (i)] was sampled and analyzed, and it was found that the Ti content was 3.01% by weight.

Then, a flask sufficiently substituted with nitrogen was charged with 50 ml of sufficiently purified n-heptane, and 5 g of the so-obtained component (i) was charged and 1.1 ml of $(CH_3)_3CSi(CH_3)(OCH_3)_2$ as the component (ii) was introduced. Contact reaction was carried out at 30° C. for 2 hours, and the contact product was sufficiently washed with n-heptane to obtain a component (A).

Polymerization of Propylene

A stainless steel autoclave provided with a stirrer and a temperature-controlling device and having an inner volume of 1.5 liters was charged with 500 ml of sufficiently dehydrated and deoxygenated n-heptane, 125 mg of triethylaluminum as the component (B) and 15 mg of the so-obtained component (A). Then, 60 ml of $H_2$ was introduced into the autoclave, and the temperature and pressure were elevated and polymerization of propylene was carried out under conditions of a polymerization pressure of 5 $Kg/cm^2G$, a polymerization temperature of 75° C. and a polymerization time of 2 hours. After termination of the polymerization, the polymer slurry obtained was separated by filtration, and the polymer was dried.

Thus, 75.4 g of the polymer was recovered. Furthermore, 1.2 g of the polymer was obtained from the filtrate. From the results of the boiling heptane extraction test, it was found that T-I.I was 94.8% by weight. MFR was 11.6 g/10 min and the bulk density of the polymer was 0.39 g/cc.

EXAMPLE 19

Prepararton of Component (A)

A flask sufficiently substituted by nitrogen was charged with 200 ml of dehydrated and deoxygenated n-heptane, and 0.1 mole of $MgCl_2$ and 0.2 mole of $Ti(O-n-C_4H_9)_4$ were introduced into the flask and reaction was carried out at 95° C. for 2 hours. After termination of the reaction, the temperature was lowered to 40° C., and 12 ml of methylhydropolysiloxane (20 cSt) was introduced into the flask and reaction was carried out for 3 hours. The solid component formed was washed with n-heptane. Then, a flask sufficiently substituted with nitrogen was charged with 50 ml of n-heptane purified in the same manner as described above, and the so-synthesized solid component was charged in the flask in an amount of 0.03 mole as calculated as the Mg atom. Then, a mixture of 25 ml of n-heptane and 0.05 mole of $SiCl_4$ was introduced into the flask at 30° C. over a period of 30 minutes and reaction was carried out at 70° C. for 3 hours. After termination of the reaction, the reaction product was washed with n-heptane. Then, a mixture of 25 ml of n-heptane and 0.003 mole of phthaloyl chloride was introduced into the flask at 70° C. over a period of 30 minutes and reaction was carried out at 95° C. for 1 hour. After termination of the reaction, the reaction product was washed with n-heptane. Then, 5 ml of $TiCl_4$ was introduced and reaction was conducted at 100° C. for 6 hours. After termination of the reaction, the reaction product was sufficiently washed with n-heptane to obtain a component (i) for the production of the component (A). The titanium content was 2.45% by weight.

The contact was carried out in the same manner as described in Example 18 except that the so-obtained component (i) was used and the amount used of $(CH_3)_3CSi(CH_3)(OCH_3)_2$ as the component (ii) was changed to 3.1 ml. The contact product was sufficiently washed with n-heptane to obtain the component (A).

Polymerization of Propylene

Polymerization of propylene was carried out in the same manner as described in Example 18 except that the so-obtained component (A) was used and the amount used of triethylaluminum as the component (B) was changed to 250 mg.

As the result, 132 g of a polymer was obtained, and MFR was 6.9 g/10 min, T-I.I was 97.2% by weight and the bulk density of the polymer was 0.46 g/cc.

EXAMPLE 20

Preparation of Component (A)

A flask sufficiently substituted with nitrogen was charged with 100 ml of dehydrated and deoxygenated n-heptane, and 0.1 mole of $MgCl_2$ and 0.2 mole of $Ti(O-n-C_4H_9)_4$ were introduced into the flask and reaction was carried out at 95° C. for 2 hours. After termination of the reaction, the temperature was lowered to 35° C., and 15 ml of 1,3,5,7-tetramethylcyclotetrasiloxane was introduced and reaction was carried out for 5 hours. The solid component formed was washed with n-heptane. Then, a flask sufficiently substituted by nitrogen was charged with 50 ml of n-heptane, and the so-synthesized solid component was introduced into the flask in an amount of 0.03 mole as calculated as the Mg atom. Then, 0.06 mole of $SiCl_4$ was introduced at 20° C. over a period of 30 minutes, and reaction was carried out at 50° C. for 3 hours. After completion of the reaction, the reaction product was washed with n-heptane to obtain a solid component (i) for the production of the component (A). The titanium content in the solid component was 4.52% by weight.

The contact was carried out in the same manner as described in Example 19 except that the so-obtained component (i) was used and the amount used of $(CH_3)_3CSi(CH_3)(OCH_3)_2$ as the component (ii) was changed to 5.4 ml. After completion of the contact, the contact product was sufficiently washed with n-heptane to obtain the component (A).

Polymerization of Propylene

Polymerization of propylene was carried out in the same manner as described in Example 19 except that the so-obtained component (A) was used, the amount used of triethyl aluminum as the component (B) was changed to 63 mg and the polymerization temperature was changed to 70° C. As the result, 89 g of a polymer was obtained, and MFR was 10.6 g/10 min, T-I.I was 94.1% by weight and the bulk density of the polymer was 0.46 g/cc.

EXAMPLE 21

The component (A) was prepared in the same manner as described in Example 19 except that ethyl benzoate was used instead of phthaloyl chloride. By using the so-obtained component (A), propylene was polymerized in the same manner as described in Example 19. As the result, 61.4 g of a polymer was obtained, and MFR was 7.8 g/10 min, T-I.I was 92.1% by weight and the bulk density of the polymer was 0.41 g/cc.

COMPARATIVE EXAMPLES 9 THROUGH 13

A catalyst was prepared in the same manner as described in Example 19 except that in the preparation of the component (A), a compound shown in Table 4 was used as the silicon compound as the component (ii), and polymerization of propylene was carried out in the same manner as described in Example 19. The results obtained are shown in Table 4.

TABLE 4

| Comp. Exam. No. | Silicon Compound | Yield (g) of Polymer | MFR (g/10 min) | Bulk Density of Polymer (g/cc) | T-I.I (% by wt) |
|---|---|---|---|---|---|
| 9 | not used | 118 | 30.6 | 0.32 | 68.9 |
| 10 | $(C_6H_5)_2Si(OCH_3)_2$ | 101 | 14.7 | 0.38 | 85.8 |
| 11 | $(CH_3)Si(OC_2H_5)_3$ | 77 | 19.8 | 0.37 | 70.6 |
| 12 | $(C_6H_5)Si(OC_2H_5)_3$ | 95 | 43.2 | 0.40 | 83.3 |
| 13 | $(C_6H_{11})Si(OCH_3)_3$ | 98 | 29.4 | 0.38 | 80.8 |

EXAMPLE 22

Preparation of Component (A)

A flask sufficiently substituted by nitrogen having a capacity of 1 liter was charged with 200 ml of dehydrated and deoxygenated n-heptane, and 0.4 mole of $MgCl_2$ and 0.8 mole of $Ti(O-n-C_4H_9)_4$ were introduced and reaction was carried out at 95° C. for 2 hours. After termination of the reaction, the temperature was lowered to 40° C., and 48 ml of methylhydropolysiloxane (20 cSt) was introduced and reaction was carried out for 3 hours. After completion of the reaction, the reaction product was washed with n-heptane.

Then, a flask sufficiently substituted by nitrogen was charged with 50 ml of n-heptane purified in the same manner as described above, and the above reaction product was introduced in an amount of 0.24 mole as calculated as the Mg atom. Then, a mixture of 25 ml of n-heptane and 0.4 mole of $SiCl_4$ was introduced into the flask at 30° C. over a period of 30 minutes, and reaction was carried out at 70° C. for 3 hours. After termination of the reaction, the reaction product was washed with n-heptane.

Then, a mixture of 25 ml of n-heptane and 0.16 mole of phthaloyl chloride was introduced into the flask at 70° C. over a period of 30 minutes, and reaction was carried out at 70° C. for 1 hour. After completion of the reaction, the reaction product was washed with n-heptane.

Finally, 25 ml of $TiCl_4$ was introduced into the flask and reaction was carried out at 100° C. for 3 hours. After termination of the reaction, the reaction product was sufficiently washed with n-heptane.

In the so-obtained solid component, the Ti-content was 2.58% by weight.

A stainless steel stirring vessel provided with a stirrer and a temperature-controlling device and having an inner volume of 1.5 liters was charged with 500 ml of sufficiently dehydrated and deoxygenated n-heptane, 4.2 g of triethylaluminum and 20 g of the so-obtained solid component. While the temperature in the stirred vessel was maintained at 20° C., propylene was introduced at a constant rate and polymerization of propylene was carried out for 30 minutes. After termination of the polymerization, the reaction product was sufficiently washed with n-heptane [component (i)]. A part of the obtained component (i) was sampled and the amount of polymerized propylene was examined, and it was found that 0.75 g of polypropylene was polymerized per g of the solid component.

A flask sufficiently substituted by nitrogen was charged with 50 ml of sufficiently dehydrated and deoxygenated n-heptane, and 5 g of the so-obtained component (i) and 0.82 ml of t-butyltrimethoxysilane as the component (ii), Si/Ti atomic ratio being 3, were introduced and contact reaction was carried out at 30° C. for 30 minutes. After termination of the reaction, the reaction product was sufficiently washed with n-heptane to obtain the component (A).

Copolymerization of Propylene

An autoclave equipped with a stirrer and having an inner capacity of 1.5 liters, the inner atmosphere of which was sufficiently substituted with propylene, was charged with 500 ml of sufficiently dehydrated and deoxygenated n-heptane, and 15 mg, as calculated as the solid component, of the component (A) and 125 mg of triethylaluminum as the component (B) were introduced at 75° C. in a propylene atmosphere.

At the first stage of polymerization, 220 ml of hydrogen was added and propylene was introduced at a constant rate of 0.932 g/min at 75° C.

After the elapse of 3 hours, introduction of propylene was stopped, and polymerization was continued at 75° C. When the pressure became 2 Kg/cm$^2$G, 1/10 of the product was sampled. The gas phase was purged until the pressure was reduced to 0.2 Kg/cm$^2$G.

At the second stage of polymerization, propylene and ethylene were introduced at constant rates of 0.0546 g/min and 0.218 g/min, respectively, at 75° C. for 1.5 hours.

After termination of the polymerization, the gas phase was purged, and the slurry was filtered and dried to obtain 164.7 g of a polymer. Separately, 1.61 g of a low crystallinity polymer (PAP) formed as a by-product was obtained by drying the filtrate. MFR of the polymer formed was 2.32 g/10 min and the bulk density (B.D.) was 0.473 g/cc.

Furthermore, a polymer having MFR of 8.72 g/10 min was obtained by drying the intermediate sample.

The results obtained are shown in Table 5.

Incidentally, MFR (MFR-2) of "Polymer Formed at Second Step" in Table 5 and subsequent Tables is an estimate value calculated from MFR (MFR-1) of the intermediate sample and MFR (MFR-A) of the polymer formed according to the following equation:

$$a \log(MFR\text{-}1) + b \log(MFR\text{-}2) = c \log(MFR\text{-}A)$$

wherein a stands for the weight of the polymer formed at the first stage, which is estimated from the amount of propylene dissolved under the polymerization temperature and pressure conditions and the feed amount of propylene, b stands for the weight of the polymer formed at the second stage, which is estimated from the amounts of propylene and ethylene dissolved under the polymerization temperature and pressure conditions and the feed amounts of propylene and ethylene, and c stands for the calculated weight of the formed polymer, given by (a+b), which is substantially in agreement with the weight of the practically obtained polymer.

Furthermore, the ethylene content in the polymer was determined by the infrared absorption spectrum analysis.

EXAMPLES 23 AND 24

The component (A) was prepared in the same manner as described in Example 22 except that a silicon compound shown in Table 5 was used as the component (ii). By using this component (A), copolymerization of propylene was carried out in the same manner as described in Example 22.

The results obtained are shown in Table 5.

COMPARATIVE EXAMPLES 14 AND 15

The component (A) was prepared in the same manner as described in Example 22 except that a silicon compound shown in Table 5 was used as the component (ii). By using this component (A), copolymerization of propylene was carried out in the same manner as described in Example 22 except that the continuous polymerization of the first stage was conducted for 90 minutes and the gas phase was purged so that the residual pressure was 0.2 Kg/cm²G.

The results obtained are shown in Table 5.

carried out in the same manner as described in Example 22.

The results obtained are shown in Table 6.

EXAMPLE 26

The catalyst component (A) was prepared in the same manner as described in Example 22 except that 0.027 mole of cellosolve acetate was used, and by using the so-obtained catalyst component (A), copolymerization of propylene was carried out in the same manner as described in Example 22 except that continuous polymerization of the first stage was conducted for 90 minutes and the gas phase was purged so that the residual pressure was 0.2 Kg/cm²G.

The results obtained are shown in Table 6.

EXAMPLE 27

Preparation of Component (A)

A flask sufficiently substituted by nitrogen was charged with 200 ml of dehydrated and deoxygenated n-heptane, and 0.4 mole of MgCl$_2$ and 0.8 mole of Ti(O—n—C$_4$H$_9$)$_4$ were charged into the flask and reaction was carried out at 95° C. for 2 hours. After termination of the reaction, the temperature was lowered to 35° C., and 60 ml of 1,3,5,7-tetramethylcyclotetrasiloxane was introduced into the flask and reaction was carried out for 5 hours. After termination of the reaction, the reaction product was washed with n-heptane.

Then, a flask sufficiently substituted by nitrogen was charged with 100 ml of n-heptane purified in the same manner as described above, and the above reaction product was charged into the flask in an amount of 0.12 mole as calculated as the Mg atom. Then, 0.24 mole of SiCl$_4$ was introduced into the flask at 20° C. over a period of 30 minutes, and reaction was carried out at 50° C. for 3 hours. After termination of the reaction, the reaction product was washed with n-heptane.

The Ti-content in the so-obtained solid component was 4.4% by weight.

The apparatus used in Example 22 for the production of the component (i) was charged with 500 ml of sufficiently dehydrated and deoxygenated n-heptane, 21.7 g of tri-isobutylaluminum and 20 g of the solid component. While the temperature in the stirred vessel was maintained at 15° C., propylene was introduced at a constant rate and polymerization of propylene was conducted for 30 minutes. After termination of the polymerization, the reaction product was sufficiently

TABLE 5

| Run | Silicon Compound | | A-mount (Si/Ti) | Polymerization Activity (g-pp/g-cat) | Formation of PAP as By-product (% by wt.) | MFR (g/10 min) | | | Ethylene Content in Polymer | B.D. (g/cc) |
|---|---|---|---|---|---|---|---|---|---|---|
| | Name | | | | | Intermediate sample | Polymer formed | Polymer formed at second step | | |
| Exam. 22 | t-butylmethyldimethoxysilane | | 3 | 12000 | 0.98 | 8.72 | 2.32 | 3.5 × 10$^{-4}$ | 6.8 | 0.473 |
| Exam. 23 | t-butyltrimethoxysilane | | 3 | 11300 | 1.25 | 6.96 | 2.89 | 1.2 × 10$^{-3}$ | 5.7 | 0.474 |
| Exam. 24 | norbonylmethyldimethoxysilane | | 3 | 12000 | 1.11 | 15.3 | 4.38 | 6.7 × 10$^{-4}$ | 6.1 | 0.468 |
| Comp. Exam. 14 | diphenyldimethoxysilane | | 3 | 11500 | 4.20 | 18.2 | 12.04 | 5.6 × 10$^{-1}$ | 6.0 | 0.368 |
| Comp. Exam. 15 | dimethyldimethoxysilane | | 3 | 8900 | 3.80 | 28.3 | 19.41 | 9.6 × 10$^{-1}$ | 6.5 | 0.380 |

EXAMPLE 25

The catalyst component (A) was prepared in the same manner as described in Example 22 except that 0.016 mole of diheptyl phthalate was used instead of phthaloyl chloride. By using the so-obtained catalyst component (A), copolymerization of propylene was washed with n-heptane. A part of the reaction product was sampled and the amount of polymerized propylene was examined, and it was found that propylene was polymerized in an amount of 2.93 g per g of the solid component [component (i)].

The component (A) was prepared in the same manner as described in Example 22 except that the so-obtained component (i) was used and t-butylmethyldimethoxysilane was used as the component (ii) in an amount of 0.75 ml per 5 g of the component (i).

Copolymerization of Propylene

Copolymerization of propylene was carried out in the same manner as described in Example 22 except that the so-obtained component (A) was used, the polymerization temperature at the first stage was changed to 70° C. and at the second stage of polymerization, only ethylene was fed at a constant rate of 0.273 g/min.

The results obtained are shown in Table 6.

n-heptane, and 5 g of the so-obtained component (i) and t-butylmethyldimethoxysilane as the component (ii) were introduced into the flask so that the Si/Ti atomic ratio was 6. Contact reaction was carried out at 30° C. for 2 hours. After completion of the contact, the reaction product was sufficiently washed with n-heptane to obtain a catalyst component (A).

Copolymerization of Propylene

An autoclave equipped with a stirrer and having an inner capacity of 1.5 liters, the inner atmosphere of which was sufficiently substituted with propylene, was charged with 500 ml of sufficiently dehydrated and deoxygenated n-heptane, and 30 mg of the so-obtained

TABLE 6

| Exam. No. | Electron Donor in Solid Component | | Polymerization Activity (g-pp/g-cat) | Formation of PAP as By-product (% by wt.) | MFR (g/10 min) | | | Ethylene Content in Polymer (% by wt.) | B.D. (g/cc) |
|---|---|---|---|---|---|---|---|---|---|
| | Compound | Amount (mole/0.24 mole of Mg) | | | Intermediate sample | Polymer formed | Polymer formed at second step | | |
| 25 | diheptyl phthalate | 0.016 | 12100 | 1.60 | 7.22 | 2.13 | $4.5 \times 10^{-4}$ | 6.2 | 0.458 |
| 26 | cellosolve acetate | 0.027 | 10500 | 2.05 | 10.40 | 4.28 | $7.2 \times 10^{-3}$ | 6.6 | 0.432 |
| 27 | not added | — | 12700 | 1.06 | 9.17 | 2.13 | $2.3 \times 10^{-4}$ | 10.8 | 0.487 |

EXAMPLE 28

Preparation of Component (A)

A flask sufficiently substituted by nitrogen having a capacity of 1 liter was charged with 200 ml of dehydrated and deoxygenated n-heptane, and 0.4 mole of $MgCl_2$ and 0.8 mole of $Ti(O-n-C_4H_9)_4$ were introduced into the flask and reaction was carried out at 95° C. for 2 hours. After termination of the reaction, the temperature was lowered to 40° C., and 48 ml of methylhydropolysiloxane (20 cSt) was introduced into the flask and reaction was carried out at this temperature for 3 hours. After termination of the reaction, the reaction product was washed with n-heptane.

Then, a flask sufficiently substituted by nitrogen was charged with 50 ml of n-heptane purified in the same manner as described above, and the obtained reaction product was charged in the flask in an amount of 0.24 mole as calculated as the Mg atom. Then, 0.4 mole of $SiCl_4$ was introduced into the flask at 30° C. over a period of 30 minutes and reaction was carried out at 70° C. for 3 hours. After termination of the reaction, the reaction product was washed with n-heptane.

Then, 0.02 mole of triethyl borate in 25 ml of n-heptane was introduced into the flask at 70° C. over a period of 30 minutes and reaction was further conducted for 1 hour. After termination of the reaction, the reaction product was washed with n-heptane.

Then, 0.016 mole of phthaloyl chloride in 25 ml of n-heptane was introduced into the flask at 70° C. over a period of 30 minutes and reaction was further conducted for 1 hour. After termination of the reaction, the reaction product was washed with n-heptane.

Finally, 0.5 g of phosphorus pentachloride was added and reaction was carried out at 95° C. for 6 hours.

The Ti-content in the so-obtained solid component [component (i)] was 1.80% by weight.

A flask sufficiently substituted by nitrogen was charged with 50 ml of dehydrated and deoxygenated catalyst component (A) and 125 mg of triethylaluminum as the component (B) were introduced into the autoclave in a propylene atmosphere.

At the first stage of polymerization, 220 ml of hydrogen was introduced, and while the temperature was maintained at 75° C., propylene was introduced at a constant rate of 0.932 g/min.

After the elapse of 3 hours, the introduction of propylene was stopped and polymerization was continued at 75° C. When the temperature became 2 $Kg/cm^2G$, 1/10 of the product was sampled and the gas phase was purged until the pressure was reduced to 0.2 $Kg/cm^2G$.

At the second stage of polymerization, propylene and ethylene were introduced at constant rates of 0.0546 g/min and 0.218 g/min, respectively, at 60° C. for 1.5 hours.

After termination of the polymerization, the gas phase was purged, and the slurry was filtered and dried to obtain 182.9 g of a polymer. Separately, 2.79 g of a low crystallinity polymer formed as a by-product was obtained by drying the filtrate. MFR of the polymer formed was 2.19 g/10 min and the bulk density of the polymer was 0.451 g/cc.

MFR of the polymer obtained by drying the intermediate sample was 4.55 g/10 min.

MFR of the polymer formed at the second stage, estimated from MFR of the polymer formed and MFR of the intermediate sample, was $8.7 \times 10^{-3}$ g/10 min.

EXAMPLES 29 AND 30 AND COMPARATIVE EXAMPLES 16 AND 17

The catalyst component (A) was prepared in the same manner as described in Example 28 except that a silicon compound shown in Table 7 was used as the component (ii) and contacted with the component (i), and by using the so-obtained catalyst component (A), copolymerization of propylene was carried out in the same manner as described in Example 28.

The results obtained are shown in Table 7.

TABLE 7

| Run | Silicon Compound Name | Amount (Si/Ti) | Polymerization Activity (g-pp/g-cat) | Formation of PAP as By-product (% by wt.) | MFR (g/10 min) Intermediate sample | MFR (g/10 min) Polymer Formed | MFR (g/10 min) Polymer formed at second step | Ethylene Content in Polymer (% by wt.) | B.D. (g/cc) |
|---|---|---|---|---|---|---|---|---|---|
| Exam. 28 | t-butylmethyldimethoxysilane | 6 | 6880 | 1.50 | 4.55 | 2.19 | $8.7 \times 10^{-3}$ | 5.5 | 0.451 |
| Exam. 29 | t-butyltrimethoxysilane | 6 | 6860 | 1.72 | 5.63 | 2.89 | $1.6 \times 10^{-2}$ | 5.4 | 0.442 |
| Exam. 30 | norbonylmethyldimethoxysilane | 6 | 6780 | 1.70 | 7.24 | 3.64 | $2.0 \times 10^{-2}$ | 5.3 | 0.448 |
| Comp. Exam. 16 | diphenyldimethoxysilane | 6 | 6510 | 1.70 | 12.93 | 8.97 | $5.6 \times 10^{-1}$ | 5.5 | 0.393 |
| Comp. Exam. 17 | dimethyldimethoxysilane | 6 | Activity was low, and, under the same conditions, experiment was impossible to continue because of elevation of pressure. | | | | | | |

EXAMPLE 31

Preparation of Component (A)]

An autoclave sufficiently substituted by nitrogen having an inner volume of 10 liters was charged with 1.0 liter of dehydrated and deoxygenated n-heptane, and 2.0 moles of $MgCl_2$ and 4.0 moles of $Ti(O-n-C_4H_9)_4$ were introduced and reaction was carried out at 95° C. for 2 hours. After completion of the reaction, the temperature was lowered to 40° C., and 300 ml of methylhydropolysiloxane (20 cSt) was introduced and reaction was carried out for 3 hours. The reaction product was washed with n-heptane.

A part of the reaction product, viz. 1.2 moles as calculated as the Mg atom, was sampled and put in n-heptane so that the solid concentration was 320 g/lit. Then, 2.0 moles of $SiCl_4$ was introduced into the slurry at 30° C. over a period of 1 hour, and reaction was carried out at 90° C. for 4 hours. After completion of the reaction, the reaction product was washed with n-heptane.

Then, 0.2 mole of triethyl borate was introduced at 30° C. over a period of 30 minutes and reaction was carried out at 70° C. for 1 hour. After termination of the reaction, the reaction product was washed with n-heptane.

Then, 0.08 mole of phthaloyl chloride was introduced at 30° C. over a period of 30 minutes. Reaction was carried out at 70° C. for 1 hour. After termination of the reaction, the reaction product was washed with n-heptane.

Finally, 125 ml of $TiCl_4$ was added to the reaction product and reaction was carried out at 100° C. for 3 hours. After completion of the reaction, the reaction product was sufficiently washed with n-heptane.

The Ti-content in the so-obtained solid component was 2.32% by weight.

A stainless steel vessel provided with a stirrer and a temperature-controlling device and having an inner capacity of 3.0 liters was charged with 2.0 lit. of sufficiently dehydrated and deoxygenated n-heptane, 17.1 g of triethylaluminum and 80 g of the so-obtained solid component. While the temperature in the stirred vessel was maintained at 15° C., propylene was introduced at a constant rate and polymerization of propylene was carried out for 2 hours. After termination of the polymerization, the reaction product was sufficiently washed with n-heptane. A part of the reaction product was sampled and the amount of polymerized propylene was examined, and it was found that propylene was polymerized in an amount of 0.68 g per g of the solid component [component (i)].

Then, 20.9 ml of t-butylmethyldimethoxysilane as the component (ii) was introduced into the stirred vessel, and contact reaction was carried out at 30° C. for 90 minutes. After termination of the contact reaction, the reaction product was washed with 2 lit. of n-heptane three times to obtain a component (A).

Polymerization of Propylene

To a polymerization vessel equipped with a stirrer and having an inner capacity of 150 liters, the so-obtained catalyst component (A) was fed at a rate of 0.26 g/hour as calculated as the solid catalyst component, triethylaluminum [catalyst component (P)] was fed at a rate of 1.75 g/hour and fresh heptane was fed at a rate of 1.28 lit./hour. In the polymerization vessel, a temperature of 75° C. and a pressure of 7 $Kg/cm^2G$ were maintained. Average residence time of propylene was 8 hours, and the polymer concentration was 45% by weight. MFR of the product polymer was adjusted by hydrogen.

The reaction mixture was fed to a degasifying tank having a capacity of 200 liters and propylene was purged until the pressure was reduced to 0.2 $Kg/cm^2G$ at 70° C. The reaction mixture was fed to a centrifugal separator and separated into the polymer formed and the filtrate. The polymer formed was fed to a drier and dried. The filtrate was once stored in a vessel and then recycled to the polymerization tank at a rate of 5.63 lit./hour. The polymerization activity was determined from the propylene feed, and a part of the reaction mixture was sampled from the polymerization vessel and 1.I of the polymer was determined.

The physical properties of the polymer obtained were determined according to the following methods.

Smell:

To 100 parts by weight of a powdery propylene polymer were added 0.05 part by weight of 2,6-di-t-butyl-4-cresol, 0.05 part by weight of tetrakis[methylene-3-(3,5-di-t-butyl-4-hydroxyphenyl)propionato]methane and 0.10 part of calcium stearate, and the composition was pelletized by a vented extruder having a diameter of 30 mm (set at 230° C.). Then, 80 g of the pellet was weighed and charged in a capped, wide-mouthed bottle having a capacity of 300 cc and heated for 2 hours in an oven set at 80° C. The smell was organoleptically judged by 5 experts according to the following ranking, and the average value was calculated.

0: smell-less
2: slight smell
4: distinguishable smell
6: definite smell
8: strong smell
10: unbearable smell Blocking Property:

Two sheets of film were piled so that the contact area was 10 $cm^2$, and the sheets were interposed between two glass plates, and the sheets were allowed to stand still in an atmosphere maintained at 40° C. under a load of 50 g/cm² for 7 days. The sheets were peeled from each other by a Schopper tensile tester, and the maximum load was read and the blocking property was evaluated based on the read maximum load.

Transparency:

The transparency was measured by a haze meter according to JIS K-6714.

Young's Modulus:

The Young's modulus was measured according to ISO R-1184.

The results obtained are shown in Table 8.

COMPARATIVE EXAMPLE 18

By using the same catalyst component (A) as prepared in Example 31, polymerization of propylene was carried out in the same manner as described in Example 31 except that recycle of the filtrate was not effected and the rate of introduction of fresh heptane to the polymerization tank was changed to 6.91 lit./hour.

The results obtained are shown in Table 8.

volume of 1.5 lit. was charged with 500 ml of sufficiently dehydrated and deoxygenated n-heptane, 4.2 g of triethylaluminum and 20 g of the so-obtained solid component, and while the temperature in the stirred vessel was maintained at 20° C., propylene was introduced at a constant rate and polymerization of propylene was carried out for 30 minutes. After completion of the polymerization, the reaction product was sufficiently washed with n-heptane. A part of the reaction product was sampled and the amount of polymerized propylene was examined, and it was found that propylene was polymerized in an amount of 0.75 g per g of the solid component [component (i)].

A flask sufficiently substituted by nitrogen was charged with 50 ml of sufficiently dehydrated and deoxygenated n-heptane and 5 q of the so-obtained component (i) was charged in the flask, and 0.82 ml of t-butyltrimethoxysilane as the component (ii) was introduced into the flask and the contact was effected at 30° C. for 30 minutes. After termination of the contact reaction, the contact product was sufficiently washed with n-

TABLE 8

| | | Results of Polymerization | | | | Quality of Polymer | | | |
|---|---|---|---|---|---|---|---|---|---|
| Run | Recycle Ratio (%) | Activity (g-pp/g-cat) | P-I.I (% by wt.) | MFR (g/10 min.) | B.D. (g/cc) | Smell (class) | Blocking property (g/10 cm²) | 4-Film Haze (%) | Young's Modulus in longitudinal direction (kg/cm²) | Young's Modulus in lateral direction (kg/cm²) |
| Exam. 31 | 90~95 | 21400 | 99.4 | 2.67 | 0.497 | 2.4 | 780 | 6.4 | 23830 | 52420 |
| Comp. Exam. 18 | 0 | 20100 | 99.3 | 2.27 | 0.496 | 2.5 | 770 | 6.7 | 23370 | 52250 |

EXAMPLE 32

Preparation of component (A)

A flask sufficiently substituted by nitrogen having a capacity of 1 liter was charged with 200 ml of dehydrated and deoxygenated n-heptane, and 0.4 mole of MgCl₂ and 0.8 mole of Ti(O—n—C₄H₉)₄ were introduced and reaction was carried out at 95° C. for 2 hours. After termination of the reaction, the temperature was lowered to 40° C., and 48 ml of methylhydropolysiloxane (20 cSt) was introduced and reaction was carried out for 3 hours. After termination of the reaction, the reaction product was washed with n-heptane.

A flask sufficiently substituted by nitrogen was charged with 50 ml of n-heptane purified in the same manner as described above, and the obtained reaction product was introduced in an amount of 0.24 mole as calculated as the Mg atom. Then, a mixture of 25 ml of n-heptane and 0.4 mole of SiCl₄ was introduced into the flask at 30° C. over a period of 30 minutes, and reaction was carried out at 70° C. for 3 hours. After termination of the reaction, the reaction product was washed with n-heptane.

Then, a mixture of 25 ml of n-heptane and 0.016 mole of phthaloyl chloride was introduced into the flask at 70° C. over a period of 30 minutes and reaction was carried out at 70° C. for 1 hour. After termination of the reaction, the reaction product was washed with n-heptane.

Finally, 25 ml of TiCl₄ was introduced into the flask and reaction was carried out at 100° C. for 3 hours. After termination of the reaction, the reaction product was washed with n-heptane.

The Ti-content in the solid component obtained was 2.58% by weight.

A stainless steel vessel provided with a stirrer and a temperature-controlling device and having an inner heptane to obtain a component (A).

Polymerization of Propylene

A stainless steel autoclave provided with a stirrer and a temperature-controlling device and having an inner volume of 1.5 lit. was charged with 500 ml of sufficiently dehydrated and deoxygenated n-heptane, 125 mg of triethylaluminum [component (B)] and 15 mg, as calculated as the solid component, of the so-synthesized component (A) at 70° C. in a propylene atmosphere. Then, 60 ml of hydrogen was introduced and polymerization was carried out at 75° C. under a propylene pressure of 5 Kg/cm²G for 2 hours. After termination of the polymerization, the polymerization reaction mixture was filtered on the line in a nitrogen atmosphere. A part of the filtrate was dried and the amount of the formed polymerization by-product was estimated. Of the filtrate, 300 ml was transferred into another stainless steel autoclave provided with a stirrer and a temperature-controlling device and having an inner volume of 1.5 lit., and 200 ml of dehydrated and deoxygenated fresh n-heptane was added. Then, 50 mg of triethylaluminum and 15 mg, as calculated as the solid component, of the component (A) were introduced at 70° C. in a propylene atmosphere. Then, 60 ml of hydrogen was added and polymerization was carried out at 75° C. under a propylene pressure of 5 Kg/cm²G for 2 hours. After termination of the polymerization, the polymerization product mixture was filtered. From the polymers and filtrates obtained by the two polymerization reactions, the activity, the estimate formation ratio of the by-product, I.I of the polymer (hereinafter referred to as "P-I.I"), MFR and the bulk density of the polymer were determined.

The results obtained are shown in Table 9.

EXAMPLE 33

The procedures of Example 32 were repeated in the same manner except that in the preparation of the component (A), 0.93 ml of norbonylmethyldimethoxysilane was used as the silicon compound as the component (ii).

The results obtained are shown in Table 9.

COMPARATIVE EXAMPLE 19

The procedures of Example 32 were repeated in the same manner except that in the production of the component (A), 1.13 ml of diphenyldimethoxysilane was used as the silicon compound as the component (ii).

The results obtained are shown in Table 9.

EXAMPLE 34

Preparation of Component (A)

A flask sufficiently substituted by nitrogen was charged with 200 ml of dehydrated and deoxygenated n-heptane, and 0.4 mole of $MgCl_2$ and 0.8 mole of $Ti(O-n-C_4H_9)_4$ were introduced into the flask and reaction was carried out at 95° C. for 2 hours. After termination of the reaction, the temperature was lowered to 35° C., and 60 ml of 1,3,5,7-tetramethylcyclotetrasiloxane was introduced into the flask and reaction was carried out for 5 hours. After termination of the reaction, the reaction product was washed with n-heptane.

Then, a flask sufficiently substituted by nitrogen was charged with 100 ml of n-heptane purified in the same manner as described above, and the so-obtained product was introduced into the flask in an amount of 0.12 mole as calculated as the Mg atom. Then, 0.24 mole of $SiCl_4$ was introduced into the flask at 20° C. over a period of 30 minutes, and reaction was carried out at 50° C. for 3 hours. After termination of the reaction, the reaction product was washed with n-heptane.

The Ti-content in the so-obtained solid component was 4.48% by weight.

In the preparation apparatus used in Example 32, 500 ml of sufficiently dehydrated and deoxygenated n-heptane, 21.7 g of tri-isobutylaluminum and 20 g of the solid component were charged. While the temperature in the stirred vessel was maintained at 15° C., propylene was introduced at a constant rate and polymerization of propylene was carried out for 30 minutes. After termination of the polymerization, the reaction product was sufficinetly washed with n-heptane. A part of the reaction product was sampled and the amount of polymerized propylene was examined, and it was found that 2.93 g of propylene was polymerized per g of the solid component.

By using the so-obtained component (i), the component (A) was prepared in the same manner as described in Example 32 except that 0.75 ml of t-butylmethyldimethoxysilane was used as the silicon compound as the component (ii).

Polymerization of Propylene

The experiment was carried out in the same manner as described in Example 32.

The results obtained are shown in Table 9.

TABLE 9

| | Silicon Compound | | First Stage Polymerization | | | | | Recycle Polymerization | | | | |
|---|---|---|---|---|---|---|---|---|---|---|---|---|
| | | | | Estimate | | | | | Estimate | | | |
| Run | Kind | Amount [ml/5 g of component (i)] | Activity (g-pp/g-cat) | Formation of By-product (% by wt.) | P-I.I (% by wt.) | MFR (g/10 min.) | B.D. | Activity (g-pp/g-cat) | Formation of By-product (% by wt.) | P-I.I (% by wt.) | MFR (g/10 min.) | B.D. |
| Exam. 32 | t-butyltri-methoxysilane | 0.82 | 11560 | 0.35 | 98.9 | 1.18 | 0.467 | 11970 | 0.37 | 98.8 | 1.01 | 0.472 |
| Exam. 33 | norbornyl-methyldi-methoxysilane | 0.93 | 12590 | 0.60 | 99.1 | 1.34 | 0.454 | 12790 | 0.67 | 99.1 | 1.29 | 0.455 |
| Comp. Exam. 19 | diphenyldi-methoxysilane | 1.12 | 9320 | 2.18 | 93.3 | 8.96 | 0.422 | 8060 | 2.84 | 91.6 | 10.88 | 0.387 |
| Exam. 34 | t-butyl-methyldimeth-oxysilane | 0.75 | 8050 | 0.81 | 97.6 | 2.01 | 0.480 | 8260 | 0.75 | 97.7 | 2.30 | 0.480 |

EXAMPLE 35

Preparation of Component (A)

A flask sufficiently substituted by nitrogen having a capacity of 1 lit. was charged with 200 ml of dehydrated and deoxygenated n-heptane, and 0.4 mole of $MgCl_2$ and 0.8 mole of $Ti(OC_4H_9)_4$ were introduced into the flask and reaction was carried out at 95° C. for 2 hours. After termination of the reaction, the temperature was lowered to 40° C., and 48 ml of methylhydropolysiloxane (20 cSt) was introduced into the flask and reaction was carried out for 3 hours. After termination of the reaction, the reaction product was washed with n-heptane.

Then, a flask sufficiently substituted by nitrogen was charged with 50 ml of n-heptane purified in the same manner as described above, and the product obtained was charged into the flask in an amount of 0.24 mole as calculated as the Mg atom. Then, 0.4 mole of $SiCl_4$ was charged into the flask at 30° C. over a period of 30 minutes, and reaction was carried out at 70° C. for 3 hours. After termination of the reaction, the reaction product was washed with n-heptane.

A mixture of 0.02 mole of triethyl borate with 25 ml of n-heptane was charged into the flask at 70° C. over a period of 30 minutes and reaction was further conducted for 1 hour. After termination of the reaction, the reaction product was washed with n-heptane.

A mixture of 0.016 mole of phthaloyl chloride with 25 ml of n-heptane was charged into the flask at 70° C. over a period of 30 minutes and reaction was further conducted for 1 hour. After termination of the reaction, the reaction product was washed with n-heptane.

Finally, 0.5 g of phosphorus pentachloride was added to the content of the flask and reaction was carried out at 95° C. for 6 hours.

The Ti-content in the so-obtained solid component [component (i)] was 1.80% by weight.

A flask sufficiently substituted by nitrogen was charged with 50 ml of dehydrated and deoxygenated n-heptane, and 5 g of the so-obtained component (i) and 2.03 ml of t-butylmethyldimethoxysilane as the component (ii) were introduced into the flask and contact reaction was carried out at 30° C. for 2 hours. After termination of the reaction, the contact product was sufficiently washed with n-heptane to obtain a catlyst component (A).

Polymerization of Propylene

In a stainless steel autoclave provided with a stirrer and a temperature-controlling device and having an inner capacity of 1.5 lit., 500 ml of sufficiently dehydrated and deoxygenated n-heptane, 125 mg of triethylaluminum [component (B)] and 15 mg, as calculated as the solid component, of the so-obtained component (A) were introduced in a propylene atmosphere. Then, 60 ml of hydrogen was introduced and polymerization was carried out at 75° C. under a propylene pressure of 5 Kg/cm$^2$G for 2 hours. After termination of the polymerization, the polymerization reaction mixture was filtered on the line in a nitrogen atmosphere, and a part of the filtrate was dried and the amount of the formed polymerization by-product was estimated. Of the filtrate, 300 ml was transferred into another stainless steel autoclave provided with a stirrer and a temperature-controlling device and having an inner capacity of 1.5 lit., and 200 ml of dehydrated and deoxygenated fresh n-heptane was added thereto. Then, 50 mg of triethylaluminum and 15 mg, as calculated as the solid component, of the component (A) used above were introduced in a propylene atmosphere. Then, 60 ml of hydrogen was introduced and polymerization was carried out at 75° C. under a propylene pressure of 5 Kg/cm$^2$G for 2 hours. After termination of the polymerization, the polymerization reaction mixture was filtered.

From the polymers and filtrartes obtained by the two polymerization reactions, the activity, the estimate formation of the by-product (in the recycle polymerization, a part of the filtrate was dried, the total by-product amount was determined and the formation ratio of the by-product formed at the recycle polymerization was calculated by subtracting the amount of the by-product contained in the filtrate transferred from the first stage polymerization from the so-determined total by-product amount), I.I of the polymer (hereinafter referred to as "P-I.I"), MFR and the bulk density of the polymer were determined.

The results obtained are shown in Table 10.

EXAMPLE 36 AND 37 and COMPARATIVE EXAMPLE 20

The procedures of Example 35 were repeated in the same manner except that in the preparation of the component (A), a silicon compound shown in Table 10 was used as the component (ii).

The results obtained are shown in Table 10.

TABLE 10

| | | | First Stage Polymerization | | | | Recycle Polymerization | | | | |
|---|---|---|---|---|---|---|---|---|---|---|---|
| | Silicon Compound | | | Estimate | | | | Estimate | | | |
| Run | Kind | Amount [ml/5 g of component (i)] | Activity (g-pp/g-cat) | Formation of By-product (% by wt.) | MFR (g/10 min.) | B.D. | Activity (g-pp/g-cat) | Formation of By-product (% by wt.) | P-I.I (% by wt.) | MFR (g/10 min.) | B.D. |
| Exam. 35 | t-butylmethyl-dimethoxysilane | 2.03 | 12800 | 0.30 | 0.97 | 0.487 | 13120 | 0.31 | 99.5 | 1.05 | 0.490 |
| Exam. 36 | t-butyltriethoxy-silane | 2.48 | 11770 | 0.42 | 1.30 | 0.482 | 12210 | 0.50 | 99.0 | 1.42 | 0.485 |
| Exam. 37 | norbornylmethyl-diethoxysilane | 2.57 | 12370 | 0.65 | 1.85 | 0.480 | 12460 | 0.58 | 98.9 | 1.73 | 0.481 |
| Comp. Exam. 20 | phenyltriethoxy-silane | 2.70 | 8610 | 2.32 | 20.81 | 0.436 | 7720 | 2.46 | 92.3 | 30.56 | 0.436 |

EXAMPLE 38

Preparation of Component (i)

A flask sufficiently substituted by nitrogen having an inner diameter of 10 cm was charged with 100 ml of dehydrated and deoxygenated n-heptane, and 0.1 mole of MgCl$_2$ and 0.2 mole of Ti(O—n—C$_4$H$_9$)$_4$ were introduced into the flask and reaction was carried out at 95° C. for 1 hour. After termination of the reaction, the temperature was lowered to 40° C., and 15 ml of methylhydrogen polysiloxane was introduced into the flask and reaction was carried out at a stirring rotation number of 20 rpm for 3 hours. After termination of the reaction, the solid component formed was washed with n-heptane, and a part of the solid component was sampled and the average particle size was measured by the sedimentation method. It was found that the average particle size was 24.5 μm.

Then, a sufficiently cleaned flask was charged with 75 ml of n-heptane and the so-obtained solid component was charged into the flask in an amount of 0.06 mole as calculated as the Mg atom. Then, a mixture of 25 ml of n-heptane and 0.1 mole of SiCl$_4$ was introduced into the flask at 30° C. over a period of 30 minutes and reaction was carried out at 90° C. for 3 hours. Then, a mixture of 25 ml of n-heptane and 0.006 mole of phthaloyl chloride was introduced into the flask at 90° C. over a period of 30 minutes and reaction was carried out at 90° C. for 1 hour. After completion of the reaction, the reaction product was washed with n-heptane. Then, 25 ml of TiCl$_4$ was introduced into the flask and reaction was carried out at 110° C. for 3 hours. After termination of the reaction, the reaction product was sufficiently washed with n-heptane. A part of the reaction product was sampled and the titanium content was measured, and it was found that the titanium content was 2.56% by weight.

Then, a stainless steel vessel provided with a stirrer and a temperature-controlling device and having an inner capacity of 1.5 lit. was charged with 500 ml of sufficiently dehydrated and deoxygenated n-heptane, 2.1 g of triethylaluminum and 10 g of the solid component obtained above. While the temperature in the stirred vessel was maintained at 20° C., propylene was introduced at a constant rate and polymerization of propylene was carried out for 30 minutes. After termination of the polymerization, the reaction product was sufficiently washed with n-heptane. A part of the reaction product was sampled and the amount of polymerized propylene was examined, and it was found that propylene was polymerized in an amount of 0.99 g per g of the solid component. The so-obtained solid component was used as the component (i) in the following procedures.

Preparation of Component (A)

A flask sufficiently substituted by nitrogen was charged with 50 ml of sufficiently purified n-heptane. Then, 5 g of the component (i) obtained above was introduced into the flask and 0.34 ml of $(CH_3)_3CSi(CH_3)(OCH_3)_2$ was introduced as the silicon compound as the component (ii), and contact reaction was carried out at 30° C. for 2 hours. After termination of the contact reaction, the contact reaction product was sufficiently washed with n-heptane to obtain a component (A).

Gas Phase Polymerization of Propylene

A gas phase polymerization apparatus disclosed in Example 1 of Japanese Patent Application Laid-Open Specification No. 73,011/1982 was charged with sufficiently purified polypropylene powder, and 100 mg of triethylaluminum and 20 mg as calculated as the solid component of the component (A) obtained above were charged in the polymerization apparatus. Then, 500 ml of hydrogen gas was introduced into the apparatus, and introduction of propylene was started at 75° C. and polymerization was carried out at 75° C. under a total pressure of 7 Kg/cm² for 3 hours.

As the result, 197 g of a polymer was obtained. MFR of the polymer was 2.3 g/10 min, the bulk density of the polymer was 0.48 g/cc, the class of the smell of the polymer was 2.2, and I.I was 99.0% by weight.

Incidentally, I.I was measured by extracting powder of the formed polymer with boiling heptane for 6 hours.

COMPARATIVE EXAMPLE 21

Preparation of Component (A)

The component (i) prepared in Example 38 was not contacted with the component (ii) but was directly used as the component (A).

Polymerization of Propylene

Polymerization of propylene was carried out in the same manner as described in Example 38 except that the catalyst component (A) mentioned above was used and 21.4 mg of diphenyldimethoxysilane was added as the third component.

As the result, 127 g of a polymer was obtained, and MFR was 5.1 g/10 min, the bulk specific gravity of the polymer was 0.44 g/cc, the class of the smell of the polymer was 5.6 and I.I was 98.5% by weight.

EXAMPLES 39 THROUGH 41

Preparation of Component (A)

The component (A) was prepared in the same manner as described in Example 38 except that a compound shown in Table 11 was used as the component (ii) in the same amount, molar ratio to the component (i) of silicon/titanium being 3.

Polymerization of Propylene

By using the so-prepared component (A), polymerization of propylene was carried out under the same conditions as adopted in Example 38 except that the kind and/or amount of the component (B) and the polymerization temperature were changed as indicated in Table 11. The results obtained are shown in Table 11.

TABLE 11

| Exam. No. | Component (ii) | Component (B) (amount used) | Polymerization Temp. (°C.) | Yield of Polymer (g) | MFR (g/10 min) | Bulk Density of Polymer (g/cc) | Smell (class) | I.I (% by wt.) |
|---|---|---|---|---|---|---|---|---|
| 39 | $(CH_3)_3CSi(OC_2H_5)_3$ | triethylaluminum (150 mg) | 75 | 181 | 3.6 | 0.47 | 2.3 | 98.1 |
| 40 | $(C_6H_5)(CH_3)_2CSi(OC_2H_5)_3$ | trihexylaluminum (322 mg) | 70 | 174 | 4.1 | 0.46 | 2.4 | 97.6 |
| 41 | $(CH_3)_3CSi(CH(CH_3)_2)(OCH_3)_2$ | triethylaluminum (75 mg) diethylaluminum chloride (25 mg) | 70 | 169 | 4.3 | 0.46 | 2.3 | 97.3 |

What is claimed is:

1. A process for the preparation of propylene copolymers, which comprises carrying out in the presence of a catalyst consisting essentially of:
(A) a solid catalyst component obtained by contacting (i) a solid component comprising titanium, magnesium and a halogen as essential ingredients obtained by contacting a magnesium halide with a titanium tetraalkoxide and a polymeric silicon compound represented by the following formula:

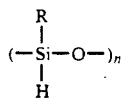

where R is a hydrocarbon residue having 1 to 10 carbon atoms, and n is the degree of polymerization such that the polymer has a viscosity of 0.1 to 100 centistokes, contacting the resulting solid component with (a) an electron donor compound and a halogen-containing titanium compound, or a silicon halide compound or a mixture thereof, or with (b) a silicon halide and phosphorus chloride, or with (c) a silicon halide, said solid component (i) having a polymer of an olefin deposited thereon in an amount of 0 to 5 gram per gram of the solid component, said polymer of an olefin having been prepared by preliminary polymerization of the olefin over said solid component (i) in the presence of an organoaluminum compound, with (ii) a silicon compound represented by the following general formula:

$R^1R^2{}_{3-n}Si(OR^3)_n$ where $R^1$ stands for a branched hydrocarbon residue having 4 to 10 carbon atoms and has a secondary or tertiary carbon atom adjacent to the silicon atom or $R^1$ is either one of:

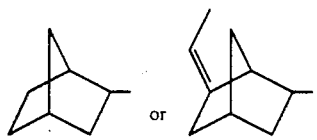

$R^2$ is a branched or linear aliphatic hydrocarbon group having 1 to 10 carbon atoms which is the same as or different from $R^1$; $R^3$ is a linear aliphatic hydrocarbon group having 1 to 4 carbon atoms, and n is a number of from 1 to 3, and washing the contact product of (i) and (ii) with n-heptane; and (B) an organoaluminum compound, the steps of (1) polymerizing propylene alone or a propylene/ethylene mixture having an ethylene content of up to 5% by weight in a single stage or multiple stages to form a polymer in an amount corresponding to 60 to 95% by weight of the total polymerization amount and (2) polymerizing a propylene/ethylene mixture having an ethylene content of 20 to 100% by weight in a single stage or multiple stages, whereby a propylene copolymer having a total ethylene content of 3 to 40% by weight is prepared.

2. The process according to claim 1, wherein silicon compound (ii) is $(CH_3)_3C—Si(OCH_3)_3$.

3. The process according to claim 1, wherein silicon compound (ii) is $(CH_3)_3C—Si(OC_2H_5)_3$.

4. The process according to claim 1, wherein silicon compound (ii) is $(C_2H_5)_3C—Si(OC_2H_5)_3$.

5. The process according to claim 1, wherein silicon compound (ii) is $(CH_3)_3C—Si(CH_3)_2(OCH_3)$.

6. The process according to claim 1, wherein silicon compound (ii) is $C_6H_5C(CH_3)_2—Si(OC_2H_5)_3$.

7. The process according to claim 1, wherein silicon compound (ii) is $(CH_3)_3—Si—CH(CH_3)_2(OCH_3)_2$.

8. The process according to claim 1, wherein silicon compound (ii) is $(CH_3)_3C—Si(CH_3)(OC_2H_5)_2$.

9. The process according to claim 1, wherein silicon compound (ii) is

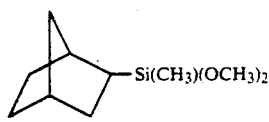

10. The process according to claim 1, wherein silicon compound (ii) is

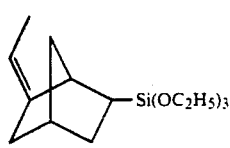

11. A process for the preparation of olefin polymers, which comprises carrying out homopolymerization or copolymerization of olefins in the presence of a catalyst consisting essentially of:

(A) a solid catalyst component obtained by contacting (i) a solid component comprising titanium, magnesium and a halogen as essential ingredients obtained by contacting a magnesium halide with a titanium tetraalkoxide and a polymeric silicon compound represented by the following formula:

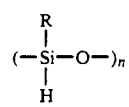

where R is a hydrocarbon residue having 1 to 10 carbon atoms, and n is the degree of polymerization such that the polymer has a viscosity of 0.1 to 100 centistokes, contacting the resulting solid component with (a) an electron donor compound and a halogen-containing titanium compound, or a silicon halide compound or a mixture thereof, or with (b) a silicon halide and phosphorus chloride, or with (c) a silicon halide, said solid component (i) having a polymer of an olefin deposited thereon in an amount of 0 to 50 gram per gram of the solid component, said polymer of an olefin having been prepared by preliminary polymerization of said solid component (i) in the presence of an organoaluminum compound, with (ii) a silicon compound represented by the following general formula:

$R^1R^2{}_{3-n}Si(OR^3)_n$ wherein $R^1$ stands for a branched hydrocarbon residue having 4 to 10 carbon atoms and $R^1$ has a secondary or tertiary carbon atoms adjacent to the silicon atom or $R^1$ is either one of:

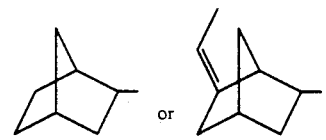

$R^2$ is a branched or linear aliphatic hydrocarbon group having 1 to 10 carbon atoms which is the same or different from $R^1$; $R^3$ is a linear aliphatic hydrocarbon group having 1 to 4 carbon atoms, and n is a number of from 1 to 3, and washing the contact product of (i) and (ii) with n-heptane; and (B) an organoaluminum compound.

12. The process according to claim 11, wherein the polymerization is carried out in a solvent including recycling at least part of the solvent left after separation of a polymer formed from the reaction mixture to the polymerization step.

13. The process according to claim 11, wherein silicon compound (ii) is $(CH_3)_3C—Si(OCH_3)_3$.

14. The process according to claim 11, wherein silicon compound (ii) is $(CH_3)_3C—Si(OC_2H_5)_3$.

15. The process according to claim 11, wherein silicon compound (ii) is $(C_2H_5)_3C—Si(OC_2H_5)_3$.

16. The process according to claim 11, wherein silicon compound (ii) is $(CH_3)_3C—Si(CH_3)_2(OCH_3)$.

17. The process according to claim 11, wherein silicon compound (ii) is $C_6H_5C(CH_3)_2-Si(OC_2H_5)_3$.

18. The process according to claim 11, wherein silicon compound (ii) is $(CH_3)_3-Si-CH(CH_3)_2(OCH_3)_2$.

19. The process according to claim 11, wherein silicon compound (ii) is $(CH_3)_3C-Si(CH_3)(OC_2H_5)_2$.

20. The process according to claim 11, wherein silicon compound (ii) is

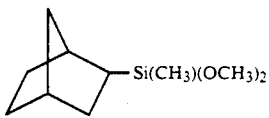

21. The process according to claim 11, wherein silicon compound (ii) is

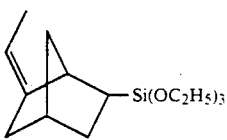

22. A process for the gas phase polymerization of olefins, which comprises polymerizing an olefin in the presence of a catalyst consisting essentially of:

(A) a solid catalyst component obtained by contacting (i) a solid component comprising titanium, magnesium and a halogen as essential ingredients obtained by contacting a magnesium halide with a titanium tetraalkoxide and a polymeric silicon compound represented by the following formula:

$$(-\underset{\underset{H}{|}}{\overset{\overset{R}{|}}{Si}}-O-)_n$$

where R is a hydrocarbon residue having 1 to 10 carbon atoms, and n is the degree of polymerization such that the polymer has a viscosity of 0.1 to 100 centistokes, contacting the resulting solid component with (a) an electron donor compound and a halogen-containing titanium compound, or a silicon halide compound or a mixture thereof, or with (b) a silicon halide and phosphorus chloride, or with (c) a silicon halide, said solid component (i) having a polymer of an olefin deposited thereon in an amount of 0 to 50 gram per gram of the solid component, said polymer of an olefin having been prepared by preliminary polymerization of the olefin over consisting essentially of said solid component (i) in the presence of an organoaluminum compound, with (ii) a silicon compound represented by the following general formula:

$$R^1R^2{}_{3-n}Si(OR^3)_n$$

where $R^1$ stands for a branched hydrocarbon residue having 4 to 10 carbon atoms and $R^1$ has a secondary or tertiary carbon atom adjacent to the silicon atom or $R^1$ is either one of:

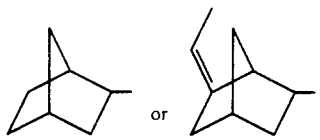

$R^2$ is a branched or linear aliphatic hydrocarbon group having 1 to 10 carbon atoms which is the same as or different from $R^1$; $R^3$ is a linear aliphatic hydrocarbon group having 1 to 4 carbon atoms, and n is a number of from 1 to 3, and washing the contact product of (i) and (ii) with n-heptane; and (B) an organoaluminum compound,
substantially in the absence of a solvent.

23. The process according to claim 22, wherein silicon compound (ii) is $(CH_3)_3C-Si(OCH_3)_3$.

24. The process according to claim 22, wherein silicon compound (ii) is $(CH_3)_3C-Si(OC_2H_5)_3$.

25. The process according to claim 22, wherein silicon compound (ii) is $(C_2H_5)_3C-Si(OC_2H_5)_3$.

26. The process according to claim 22, wherein silicon compound (ii) is $(CH_3)_3C-Si(CH_3)_2(OCH_3)$.

27. The process according to claim 22, wherein silicon compound (ii) is $C_6H_5(CH_3)_2-Si(OC_2H_5)_3$.

28. The process according to claim 22, wherein silicon compound (ii) is $(CH_3)_3-Si-CH(CH_3)_2(OCH_3)_2$.

29. The process according to claim 22, wherein silicon compound (ii) is $(CH_3)_3C-Si(CH_3)(OC_2H_5)_2$.

30. The process according to claim 22, wherein silicon compound (ii) is

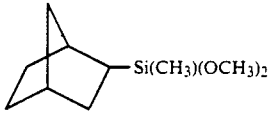

31. The process according to claim 22, wherein silicon compound (ii) is

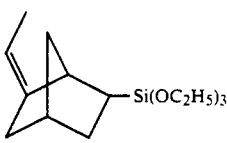

32. The process according to claims 1, 11, 22, or 12, wherein the ratio between the amounts of component (i) and (ii) to be contacted with each other is such that the Si/Ti atomic ratio of silicon in the component (ii) to titanium in the component (i) is from 0.01:1 to 1,000:1.

33. The process according to claims 1, 11, 22, or 12, wherein in the component (i), the olefin is preliminarily polymerized in an amount of 0.001 to 50 grams per gram of the solid component.

34. A process for the preparation of olefin polymers, which comprises polymerizing an olefin having the formula $R-CH=CH_2$ wherein R is hydrogen or a hydrocarbon group having 1 to 10 carbon atoms in the presence of a catalyst comprising, (A) a solid catalyst component obtained by contacting (i) a solid component comprising titanium, magnesium and a halogen as essential ingredients obtained by contacting a magnesium halide with a titanium tetraalkoxide and a methylhydrogen polysiloxane and contacting the resulting solid component with (a) an electron donor compound and a halogen-containing titanium compound. or a silicon halide compound or a mixture thereof, or with (b) a silicon halide with (ii) a silicon compound represented by the following general formula:

$$R^1R^2{}_{3-n}Si(OR^3)_n$$

where $R^1$ stands for a branched hydrocarbon residue having 4 to 10 carbon atoms and has a secondary or tertiary carbon atom adjacent to the silicon atom, $R^2$ is a branched or linear aliphatic hydrocarbon group having 1 to 10 carbon atoms which is the same as or different from $R^1$; $R^3$ is a linear aliphatic hydrocarbon group having 1 to 4 carbon atoms, and n is a number of from 1 to 3, and (B) an organoaluminum compound.

35. The process according to claim 34 carried out in the gas phase.

36. The process according to claim 34 carried out in the presence of a solvent.

37. The process according to claim 34, wherein the olefin is propylene.

38. The process according to claims 34, 35, 36 or 37, wherein the ratio between the amounts of component (i) and (ii) to be contacted with each other is such that the Si/Ti atomic ratio of silicon in the component (ii) to titanium in the component (i) is from 0.1:1 to 1,000:1.

39. The process according to claim 34, wherein silicon compound (ii) is $(CH_3)_3C—Si(OCH_3)_3$.

40. The process according to claim 34, wherein silicon compound (ii) is $(CH_3)_3C—Si(OC_2H_5)_3$.

41. The process according to claim 34, wherein silicon compound (ii) is $(C_2H_5)_3C—Si(OC_2H_5)_3$.

42. The process according to claim 34, wherein silicon compound (ii) is $(CH_3)_3C—Si(CH_3)_2(OCH_3)$.

43. The process according to claim 34, wherein silicon compound (ii) is $C_6H_5C(CH_3)_2—Si(OC_2H_5)_3$.

44. The process according to claim 34, wherein silicon compound (ii) is $(CH_3)_3—Si—CH(CH_3)_2(OCH_3)_2$.

45. The process according to claim 34, wherein silicon compound (ii) is $(CH_3)_3C—Si(CH_3)(OC_2H_5)_2$.

46. The process according to claim 34, wherein $R^1$ of the silicon compound (ii) is a secondary carbon atom.

47. The process according to claim 34, wherein $R^1$ in the silicon compound (ii) is a tertiary carbon atom.

48. The process according to claims 1, 11, 22, 12 or 34, wherein components (i) and (ii) are contacted at 50° to 200° C. by mechanical milling or stirring pulverizing, or by stirring in an inert diluent.

* * * * *